US009406280B2

(12) United States Patent  
Ota

(10) Patent No.: US 9,406,280 B2  
(45) Date of Patent: Aug. 2, 2016

(54) IMAGE DISPLAY DEVICE, IMAGE DISPLAY SYSTEM, AND METHOD OF CONTROLLING IMAGE DISPLAY DEVICE

(71) Applicant: SEIKO EPSON CORPORATION, Tokyo (JP)

(72) Inventor: Koichiro Ota, Oomachi (JP)

(73) Assignee: SEIKO EPSON CORPORATION, Tokyo (JP)

(*) Notice: Subject to any disclaimer, the term of this patent is extended or adjusted under 35 U.S.C. 154(b) by 17 days.

(21) Appl. No.: 14/180,715

(22) Filed: Feb. 14, 2014

(65) Prior Publication Data  
US 2014/0267102 A1 Sep. 18, 2014

(30) Foreign Application Priority Data

Mar. 18, 2013 (JP) .................. 2013-055163  
Mar. 18, 2013 (JP) .................. 2013-055164

(51) Int. Cl.  
G09G 5/12 (2006.01)  
G06F 3/14 (2006.01)  
G09G 3/00 (2006.01)  
G06F 3/042 (2006.01)  
G06F 3/0354 (2013.01)

(52) U.S. Cl.  
CPC .............. *G09G 5/12* (2013.01); *G06F 3/03545* (2013.01); *G06F 3/0425* (2013.01); *G06F 3/1423* (2013.01); *G06F 3/1454* (2013.01); *G09G 3/002* (2013.01); *G09G 2340/02* (2013.01); *G09G 2340/0442* (2013.01); *G09G 2340/14* (2013.01); *G09G 2354/00* (2013.01); *G09G 2370/12* (2013.01)

(58) Field of Classification Search  
CPC . G06F 3/0425; G06F 3/0488; G06F 3/04883; G06F 1/1692; G06F 3/1438; H04N 1/181; G09G 2340/10  
See application file for complete search history.

(56) References Cited

U.S. PATENT DOCUMENTS

| 6,353,434 B1* | 3/2002 | Akebi | G06F 3/0418 345/173 |
| 2002/0118180 A1* | 8/2002 | Martin | G03B 21/132 345/178 |
| 2003/0117532 A1 | 6/2003 | Karasawa et al. | |
| 2004/0150627 A1* | 8/2004 | Luman | H04L 67/38 345/173 |

(Continued)

FOREIGN PATENT DOCUMENTS

| JP | A-2003-198870 | 7/2003 |
| JP | A-2004-309659 | 11/2004 |

(Continued)

*Primary Examiner* — Quan-Zhen Wang  
*Assistant Examiner* — Dong Hui Liang  
(74) *Attorney, Agent, or Firm* — Oliff PLC

(57) ABSTRACT

A projector capable of outputting an image to an electronic apparatus is provided, wherein the image is obtained by drawing a picture corresponding to a coordinate input from an electronic apparatus having a touch panel, or a coordinate input from an indicating body on an input image. The projector includes a video signal acquisition section adapted to obtain a first image, a first coordinate data acquisition section adapted to obtain first coordinate data from a tablet terminal having a touch panel, an image data acquisition section adapted to obtain image data representing a second image obtained by drawing a picture, which corresponds to the first coordinate data, on the first image, and an image data output section adapted to output the image data, which is obtained by the image data acquisition section, to the tablet terminal.

9 Claims, 17 Drawing Sheets

(56) References Cited

U.S. PATENT DOCUMENTS

2006/0170874 A1 8/2006 Yumiki et al.
2011/0109554 A1* 5/2011 Boissier ............. G06F 3/03545
　　　　　　　　　　　　　　　　　　345/166

FOREIGN PATENT DOCUMENTS

| JP | A-2009-098384 | 5/2009 |
| JP | A-2011-133541 | 7/2011 |

* cited by examiner

IMAGE DISPLAY DEVICE, IMAGE DISPLAY SYSTEM, AND METHOD OF CONTROLLING IMAGE DISPLAY DEVICE

CROSS-REFERENCE

The entire disclosure of Japanese Patent Application No. 2013-055163, filed Mar. 18, 2013 and Japanese Patent Application No. 2013-055164, filed Mar. 18, 2013 is expressly incorporated by reference herein.

BACKGROUND

1. Technical Field

The present invention relates to an image display device, an image display system, and a method of controlling an image display device.

2. Related Art

There is known a technology for transmitting an image from a terminal device such as a cellular phone to a projector using a wireless connection. In JP-A-2003-198870, it is described that a portable terminal transmits projection data to a projector wirelessly connected to the portable terminal. In JP-A-2009-98384, it is described that an image of a portable terminal is projected on a screen in an eye-friendly manner by using a server capable of the wireless connection in between. Further, there has been known an interactive projection system allowing the user to perform pseudo-writing on a projection surface on which an image is projected using a pen-type indicating body.

However, it is not achievable to perform drawing on the projection screen using a portable terminal in the system described above.

SUMMARY

An advantage of some aspects of the invention is to make an image to be output from an image display device to an electronic apparatus or displayed on the image display device, wherein in the image, a picture corresponding to a coordinate input from an electronic apparatus having a touch panel, or a coordinate input from an indicating body is drawn on an input image.

An aspect of the invention is directed to an image display device including a video signal acquisition section adapted to obtain a video signal representing a first image, a first coordinate data acquisition section adapted to obtain first coordinate data representing a coordinate of a point on the first image from an electronic apparatus having a touch panel, an image data acquisition section adapted to obtain image data representing a second image obtained by drawing a picture, which corresponds to the first coordinate data obtained by the first coordinate data acquisition section, on the first image, and an image data output section adapted to output the image data, which is obtained by the image data acquisition section, to the electronic apparatus. According to the image display device of the aspect of the invention, the second image obtained by drawing the picture, which corresponds to the coordinate input from the electronic apparatus, on the first image is output to the electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
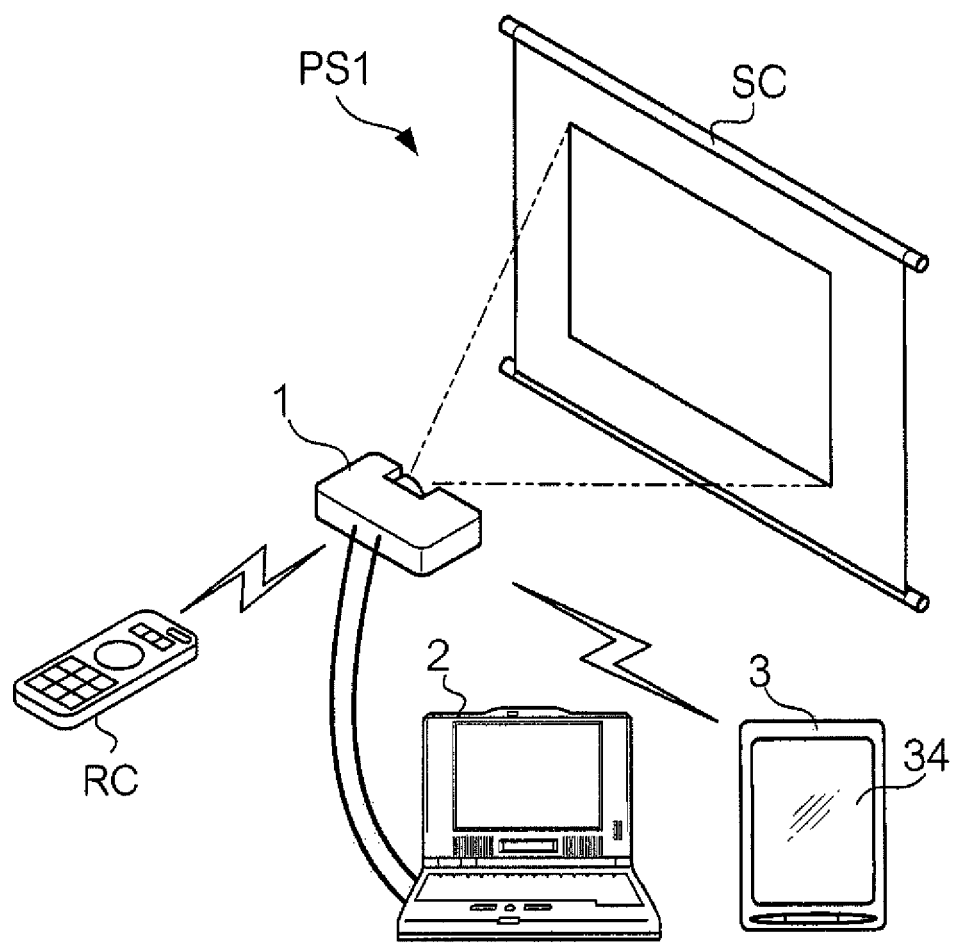
FIG. 1 is a diagram showing an overall configuration of a projection system.

FIG. 1 is a diagram showing an overall configuration of a projection system PS1 according to a first embodiment of the invention. The projection system PS1 has a projector 1, a personal computer 2, a tablet terminal 3, a controller RC, and a screen SC. The projector 1 is a device for projecting an image (hereinafter referred to as an "input image") represented by a video signal on the screen SC. The projector 1 is an example of an image display device. The personal computer (hereinafter referred to as a "PC") 2 outputs the video signal to the projector 1. The PC 2 is connected to the projector 1 with an image signal cable and a USB (Universal Serial Bus) cable with wired connection. The PC 2 is an example of an external device as a video signal source. The tablet terminal 3 functions as a pointing device (an input device) for operating the PC 2. The tablet terminal 3 is connected to the projector 1 via a wireless LAN (Local Area Network) compliant with, for example, Wi-Fi (Wireless Fidelity; a registered trademark). The tablet terminal 3 is an example of an electronic apparatus. By the user operating a touch panel 34 of the tablet terminal 3, the input operation to the PC 2 is performed. Specifically, when the user operates the touch panel 34, a picture corresponding to the operation is drawn on the input image in the PC 2. The controller RC is a device for controlling the projector 1 using wireless communication such as infrared communication, a so-called remote controller. The screen SC is a plane reflecting an image (hereinafter referred to as a "projection image") projected from the projector 1.

Figure 2:
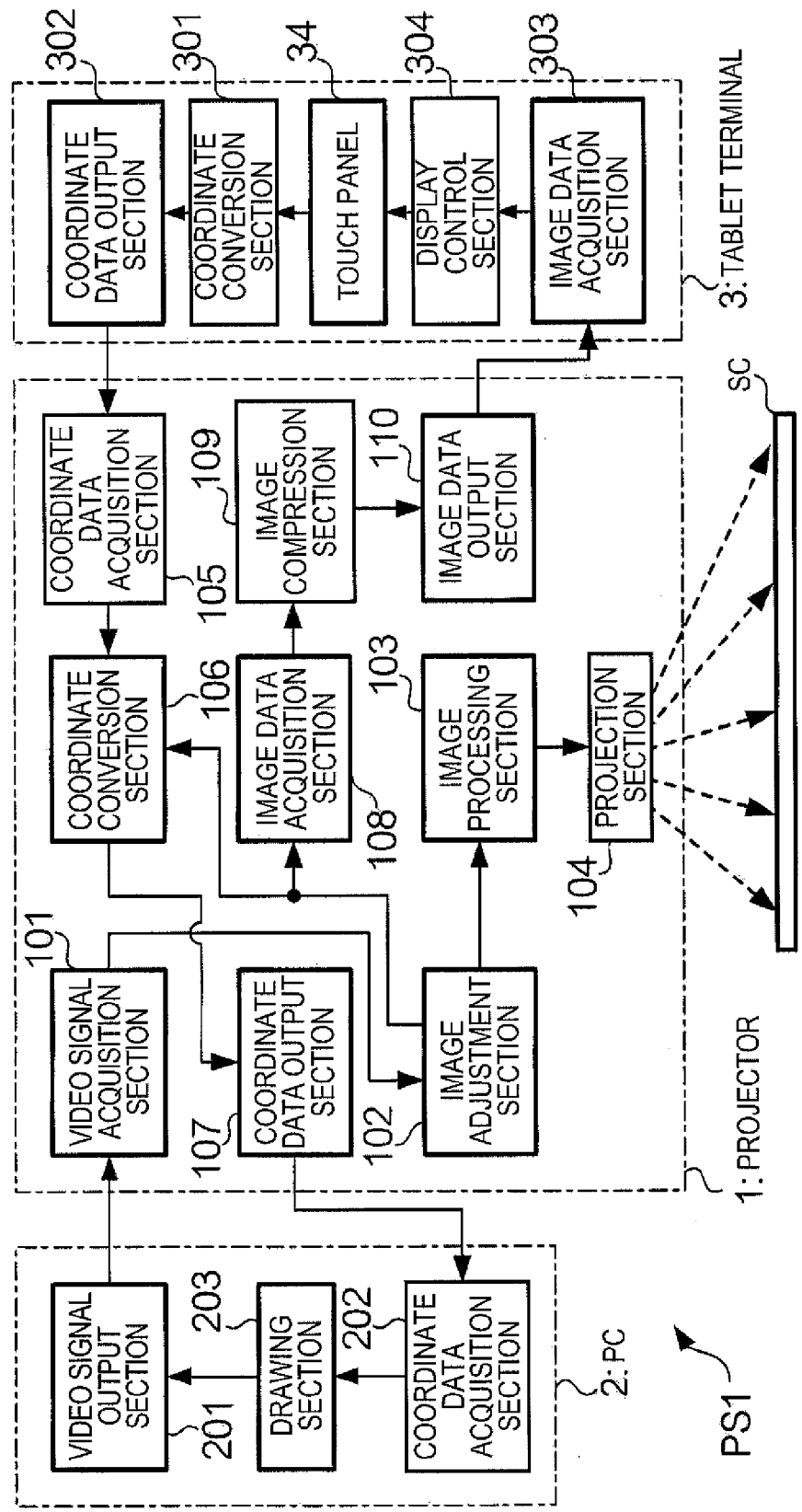
FIG. 2 is a block diagram showing a functional configuration of the projection system.

FIG. 2 is a block diagram showing a functional configuration of the projection system PS1. The projector 1 includes a video signal acquisition section 101, an image adjustment section 102, an image processing section 103, a projection section 104, a coordinate data acquisition section 105, a coordinate conversion section 106, a coordinate data output section 107, an image data acquisition section 108, an image compression section 109, and an image data output section 110. The video signal acquisition section 101 obtains the video signal output from the PC 2. The image adjustment section 102 changes (resizes) the size (the resolution) of the input image to a size corresponding to the projection section 104. Hereinafter, a process of changing the size of the input image is expressed as a "resizing process." The image processing section 103 performs predetermined image processing on the input image (hereinafter referred to as a "resized image") having been resized. The projection section 104 projects the input image, on which the image processing has been performed by the image processing section 103, on the screen SC as a projection image. The coordinate data acquisition section 105 (an example of a first coordinate data acquisition section) obtains the coordinate data (an example of first coordinate data) representing the coordinate of a point on the input image from the tablet terminal 3. The coordinate conversion section 106 converts a coordinate system of the coordinate represented by the coordinate data obtained by the coordinate data acquisition section 105 into a coordinate system of the input image. The coordinate data output section 107 outputs the coordinate data, the coordinate system of which has been converted by the coordinate conversion section 106, to the PC 2. The image data acquisition section 108 obtains the image data representing the resized image from the image adjustment section 102. Hereinafter, for the sake of convenience of explanation, the input image, in which the picture corresponding to the coordinate data has not been drawn, is referred to as a "primary image," and an image obtained by drawing the picture corresponding to the coordinate data on the primary image is referred to as a "secondary image." The image data obtained by the image data acquisition section 108 represents the resized image of the primary image or the secondary image. The image compression section 109 compresses the image data obtained by the image data acquisition section 108. The image data output section 110 outputs the image data compressed by the image compression section 109 to the tablet terminal 3.

The PC 2 includes a video signal output section 201, a coordinate data acquisition section 202, and a drawing section 203. The video signal output section 201 outputs the video signal to the projector 1. The coordinate data acquisition section 202 obtains the coordinate data output by the projector 1. The drawing section 203 draws the picture, which corresponds to the coordinate data obtained by the coordinate data acquisition section 202, on the primary image to thereby generate the secondary image.

The tablet terminal 3 includes a coordinate conversion section 301, a coordinate data output section 302, an image data acquisition section 303, and a display control section 304. The coordinate conversion section 301 converts the coordinate of a point designated by the user on the touch panel 34 into the coordinate of a point on the primary image, and then generates the coordinate data representing the coordinate. The coordinate data output section 302 outputs the coordinate data generated by the coordinate conversion section 301 to the projector 1. The image data acquisition section 303 obtains the image data output by the projector 1. The display control section 304 displays the image, which is represented by the image data thus obtained by the image data acquisition section 303, on the touch panel 34. It should be noted that the touch panel 34 has a display section formed of a liquid crystal panel or the like.

Figure 3:
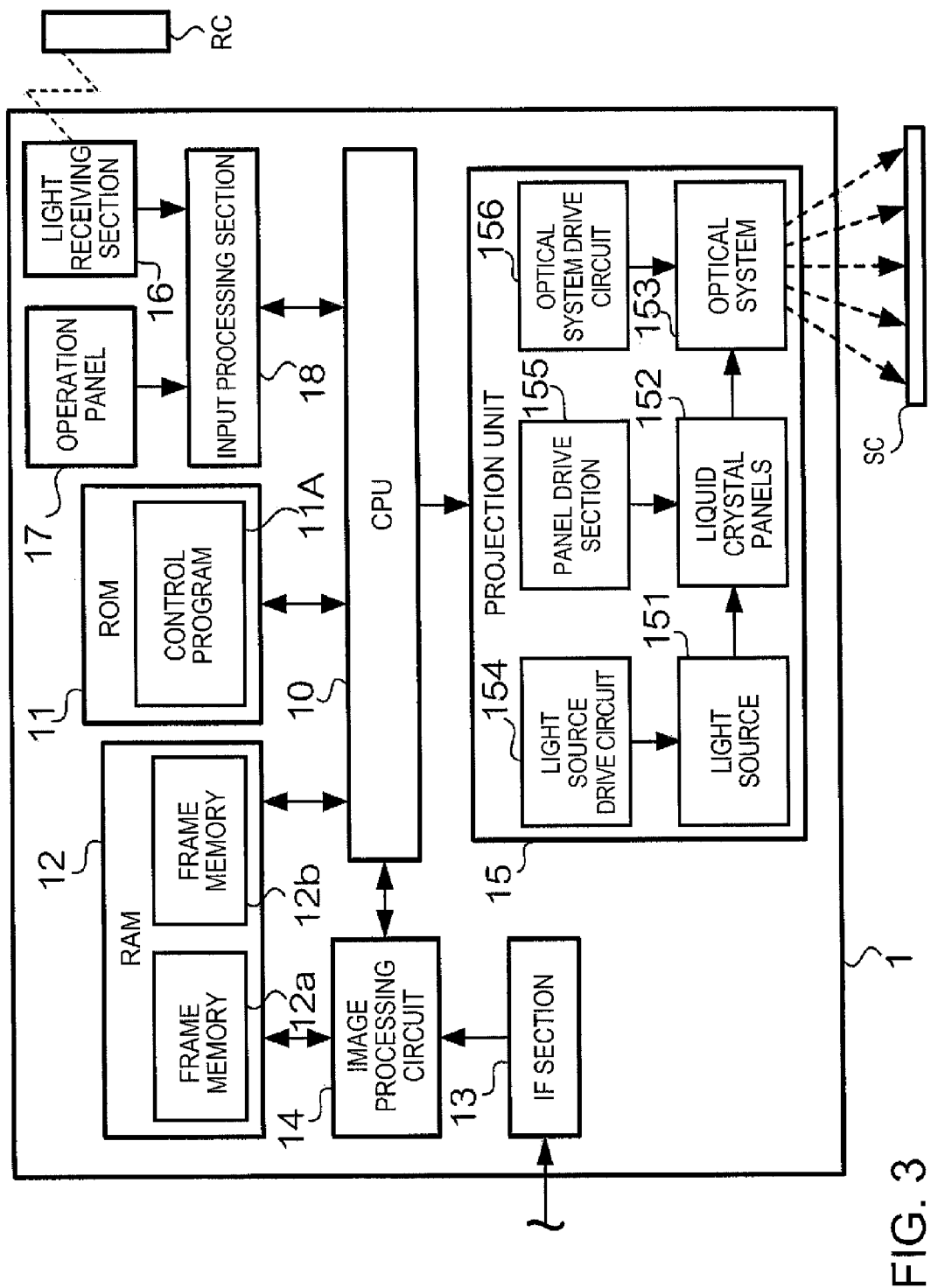
FIG. 3 is a block diagram showing a hardware configuration of a projector.

FIG. 3 is a block diagram showing a hardware configuration of the projector 1. The projector 1 includes a central processing unit (CPU) 10, a read only memory (ROM) 11, a random access memory (RAM) 12, an interface (IF) section 13, an image processing circuit 14, a projection unit 15, a light receiving section 16, an operation panel 17, and an input processing section 18. The CPU 10 is a control device which executes a control program 11A to thereby control the sections of the projector 1. The ROM 11 is a nonvolatile storage device storing a variety of programs and data. The ROM 11 stores the control program 11A to be executed by the CPU 10. The RAM 12 is a volatile storage device for storing data. The RAM 12 includes a frame memory 12a and a frame memory 12b. The frame memory 12a is an area for storing one frame of the resized image. The frame memory 12b is an area for storing one frame of the projection image.

The IF section 13 communicates with an information processing device such as the PC 2 and the tablet terminal 3. The IF section 13 is provided with a variety of types of terminals (e.g., a VGA terminal, a USB terminal, a wired or wireless LAN interface, an S terminal, an RCA terminal, and an HDMI (High-Definition Multimedia Interface; a registered trademark) terminal) for connecting to the information processing device. In the present embodiment, the IF section 13 communicates with the PC 2 via the VGA terminal and the USE terminal. Specifically, the IF section 13 obtains the video signal from the PC 2 via the VGA terminal, and outputs the coordinate data to the PC 2 via the USB terminal. The IF section 13 extracts vertical and horizontal sync signals from the video signal obtained from the PC 2. The IF section 13 also communicates with the tablet terminal 3 via the wireless LAN interface. The image processing circuit 14 performs a resizing process and predetermined image processing on the input image. The image processing circuit 14 writes the resized image in the frame memory 12a, and writes the resized image (i.e., the projection image) after the image processing in the frame memory 12b.

The projection unit 15 includes a light source 151, liquid crystal panels 152, an optical system 153, a light source drive circuit 154, a panel drive circuit 155, and an optical system drive circuit 156. The light source 151 has a lamp such as a high-pressure mercury lamp, a halogen lamp, or a metal halide lamp, or a light emitting body such as a light emitting diode (LED) or a laser diode, and irradiates the liquid crystal panels 152 with light. The liquid crystal panels 152 are each a light modulation device for modulating the light emitted from the light source 151 in accordance with the image data. In the present example, each of the liquid crystal panels 152 has a plurality of pixels arranged in a matrix. Each of the liquid crystal panels 152 has the resolution of, for example, XGA (eXtended Graphics Array), and has a display area composed of 1024×768 pixels. In this example, the liquid crystal panels 152 are each a transmissive liquid crystal panel, and the transmittance of each of the pixels is controlled in accordance with the image data. The projector 1 has three liquid crystal panels 152 corresponding respectively to the three primary colors of RGB. The light from the light source 151 is separated into colored lights of three colors of RGB, and the colored lights respectively enter the corresponding liquid crystal panels 152. The colored lights, which have been modulated while passing through the respective liquid crystal panels, are combined by a cross dichroic prism or the like, and the combined light is then emitted to the optical system 153. The optical system 153 includes a lens for enlarging the light modulated by the liquid crystal panels 152 into the image light and then projecting the light on the screen SC, a zoom lens for performing expansion/contraction of the image to be projected, and the focus adjustment, a zoom controlling motor for controlling a zoom level, a focus adjusting motor for performing the focus adjustment, and so on. The light source drive circuit 154 drives the light source 151 with the control by the CPU 10. The panel drive circuit 155 drives the liquid crystal panel 152 in accordance with the image data output from the CPU 10. The optical system drive circuit 156 drives the motors included in the optical system 153 with the control by the CPU 10.

The light receiving section 16 receives an infrared signal transmitted from the controller RC, decodes the infrared signal thus received, and then outputs the result to the input processing section 18. The operation panel 17 has buttons and switches for performing ON/OFF of the power and a variety of operations of the projector 1. The input processing section 18 generates the information representing the operation content by the controller RC or the operation panel 17, and then outputs the information to the CPU 10.

In the projector 1, the CPU 10 executing the program is an example of the coordinate conversion section 106, the image data acquisition section 108, and the image compression section 109. The IF section 13, which is controlled by the CPU 10 executing the program, is an example of the video signal acquisition section 101, the coordinate data acquisition section 105, the coordinate data output section 107, and the image data output section 110. In the projector 1, the image processing circuit 14, which is controlled by the CPU 10 executing the program, is an example of the image adjustment section 102 and the image processing section 103. The projection unit 15, which is controlled by the CPU 10 executing the program, is an example of the projection section 104.

Figure 4:
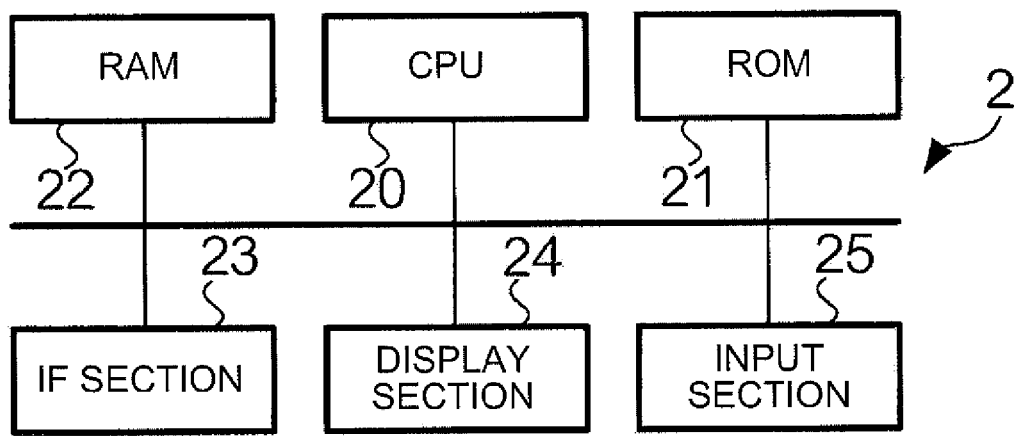
FIG. 4 is a block diagram showing a hardware configuration of a PC.

FIG. 4 is a block diagram showing a hardware configuration of the PC 2. The PC 2 includes a CPU 20, a ROM 21, a RAM 22, an IF section 23, a display section 24, and an input section 25. The CPU 20 is a control device which executes a program to thereby control the sections of the PC 2. The ROM 21 is a nonvolatile storage device storing a variety of programs and data. The RAM 22 is a volatile storage device for storing data. The IF section 23 communicates with an information processing device such as the projector 1. The IF section 23 is provided with a variety of types of terminals for connecting to the information processing device. The display section 24 includes a display device such as a liquid crystal display or an organic electroluminescence (EL) display. The input section 25 is a device for receiving the input by the user, and is provided with a keyboard, a mouse, a variety of types of buttons, and so on. In the PC 2, the CPU 20 executing the program is an example of the drawing section 203. The IF section 23, which is controlled by the CPU 20 executing the program, is an example of the video signal output section 201 and the coordinate data acquisition section 202.

Figure 5:
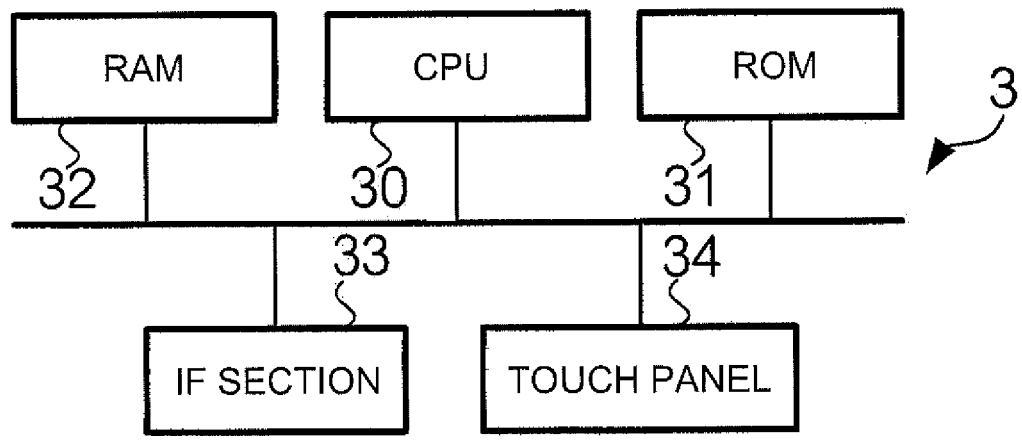
FIG. 5 is a block diagram showing a hardware configuration of a tablet terminal.

FIG. 5 is a block diagram showing a hardware configuration of the tablet terminal 3. The tablet terminal 3 includes a CPU 30, a ROM 31, a RAM 32, an IF section 33, and the touch panel 34. The CPU 30 is a control device which executes a program to thereby control the sections of the tablet terminal 3. The ROM 31 is a nonvolatile storage device storing a variety of programs and data. The RAM 32 is a volatile storage device for storing data. The IF section 33 communicates with an information processing device such as the projector 1. The IF section 33 is provided with a wireless LAN interface for connecting to the projector 1. The touch panel 34 is an input device having a panel for sensing a coordinate stacked on a display surface of, for example, a liquid crystal display. A touch panel of, for example, an optical type, a resistance film type, a capacitance type, or an ultrasonic type is used for the touch panel 34. In the tablet terminal 3, the CPU 30 executing the program is an example of the coordinate conversion section 301, and the display control section 304. The IF section 33, which is controlled by the CPU 30 executing the program, is an example of the coordinate data output section 302 and the image data acquisition section 303.

Figure 6:
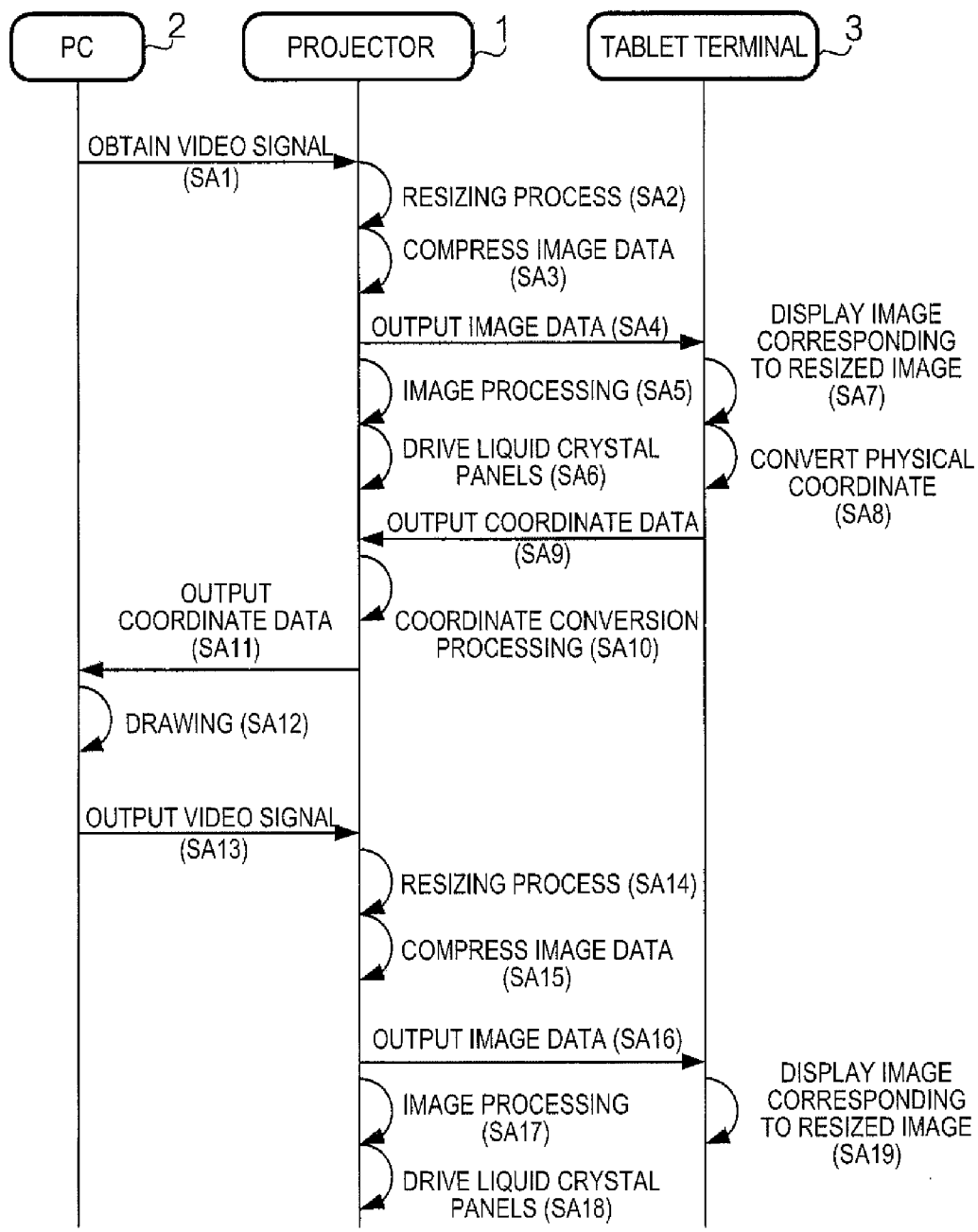
FIG. 6 is a sequence chart showing a process in the projection system.

FIG. 6 is a sequence chart showing a process executed in the projection system PS1. In this example, the PC 2 executes a drawing program for drawing a picture on the input image (here, the image displayed on the display section 24). In such a circumstance, in the case of attempting to perform drawing on the input image (and the projection image), there can be cited a method of operating the input section 25 (e.g., the mouse) of the PC 2. However, since the projector 1 and the PC 2 are connected to each other with the wired connection, there arises a distance limitation in performing the drawing in a place distant from the projector 1. The projection system PS1 makes the tablet terminal 3 function as a pointing device for operating the PC 2 to thereby suppress the distance limitation in performing the drawing. The process shown in FIG. 6 is triggered by, for example, the fact that the PC 2 outputs the video signal (here, the video signal representing the primary image) to the projector 1.

In the step SA1, the CPU 10 of the projector 1 obtains the video signal from the PC 2. In the step SA2, the CPU 10 performs the resizing process on the input image. Due to the resizing process, the CPU 10 changes the size of the input image to a size corresponding to the liquid crystal panels 152.

Figure 7:
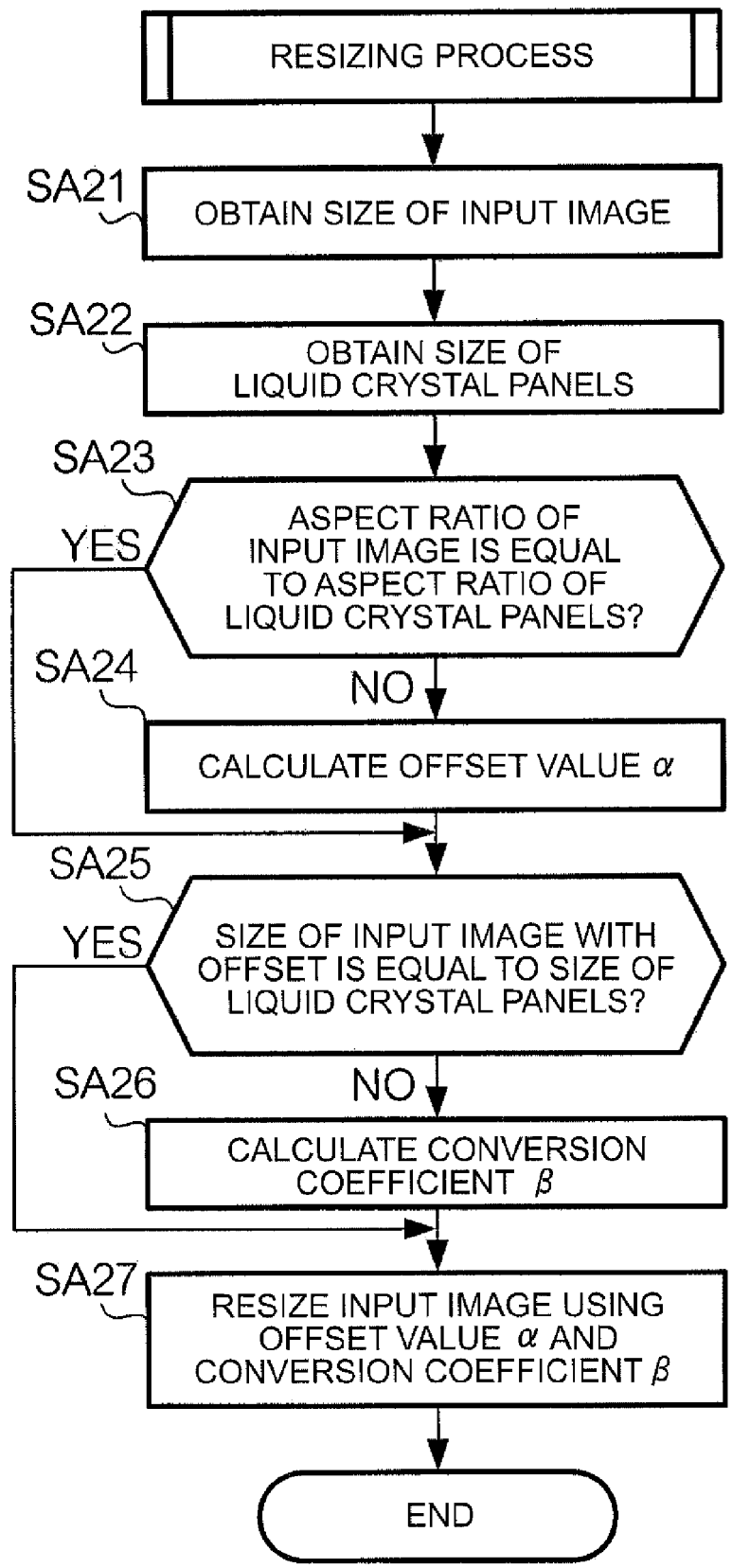
FIG. 7 is a flowchart showing a resizing process.

FIG. 7 is a flowchart showing a specific processing content of the resizing process. Hereinafter, the case (the case of contracting the input image) in which the size of the input image is larger than the size of each of the liquid crystal panels 152 will be explained as an example. In the step SA21, the CPU 10 obtains the size of the input image. The size of the image mentioned here denotes the number of pixels of the image in the vertical direction and the number of the pixels of the image in the horizontal direction. The video signal includes a signal representing the size of the input image, and the CPU 10 obtains the size of the input image based on the signal. The CPU 10 stores the size of the input image thus obtained in the RAM 12. In the step SA22, the CPU 10 obtains the size of each of the liquid crystal panels 152. Specifically, the CPU 10 reads out the information representing the resolution of each of the liquid crystal panels 152 stored in the ROM 11 to obtain the size of each of the liquid crystal panels 152.

In the step SA23, the CPU 10 determines whether or not the aspect ratio of the input image and the aspect ratio of each of the liquid crystal panels 152 are equal to each other. Specifically, the CPU 10 calculates the aspect ratio of the input image and the aspect ratio of each of the liquid crystal panels 152 based on the size of the input image and the size of each of the liquid crystal panels 152, respectively, and then compares these aspect ratios. In the case in which it is determined that the aspect ratio of the input image and the aspect ratio of each of the liquid crystal panels 152 are not equal to each other (NO in the step SA23), the CPU 10 makes a transition of the process to the step SA24. In the case in which it is determined that the aspect ratio of the input image and the aspect ratio of each of the liquid crystal panels 152 are equal to each other (YES in the step SA23), the CPU 10 makes a transition of the process to the step SA25. For example, in the case in which the size of the input image is 800 by 1280, the aspect ratio is 16:10. Further, in the case in which the size of each of the liquid crystal panels 152 is 768 by 1024, the aspect ratio is 4:3. Therefore, in this case, it is determined that the aspect ratio of the input image and the aspect ratio of each of the liquid crystal panels 152 are not equal to each other.

In the step SA24, the CPU 10 calculates an offset value α. The offset value denotes a value representing the horizontal number of the pixels to be uniformly removed from the input image in the resizing process. The CPU 10 reads out the size of the input image and the size of each of the liquid crystal panels 152 from the RAM 12 to calculate the offset value α using, for example, Formula (1) below.

$$\alpha = L1 - (L2 \times L3/L4) \quad (1)$$

(L1: the horizontal pixel number of the input image, L2: the vertical pixel number of the input image, L3: the horizontal pixel number of each of the liquid crystal panels 152, L4: the vertical pixel number of each of the liquid crystal panels 152)

The CPU 10 stores the offset value α thus calculated in the RAM 12. In the example described above, the pixel numbers are L1=1280, L2=800, L3=1024, and L4=768, and the offset value α becomes α=214.

In the step SA25, the CPU 10 determines whether or not the size of the input image (hereinafter referred to as an "offset input image size") defined taking the offset value α into consideration and the size of each of the liquid crystal panels 152 are equal to each other. Specifically, the CPU 10 reads out the size of the input image and the offset value α separately from the RAM 12, and then subtracts the offset value α from the horizontal pixel number of the input image to thereby calculate the offset input image size. Then, the CPU 10 reads out the size of each of the liquid crystal panels 152 from the ROM 11, and then compares the offset input image size and the size of each of the liquid crystal panels 152 with each other. In the case in which it is determined that the offset input image size and the size of each of the liquid crystal panels 152 are not equal to each other (NO in the step SA25), the CPU 10 makes a transition of the process to the step SA26. In the case in which it is determined that the offset input image size and the size of each of the liquid crystal panels 152 are equal to each other (YES in the step SA25), the CPU 10 makes a transition of the process to the step SA27. In the example of the sizes described above, the offset input image size is 800 by 1066, and the size of the projection image is 768 by 1024. Therefore, it is determined that the offset input image size and the size of each of the liquid crystal panels 152 are not equal to each other.

In the step SA26, the CPU 10 calculates a conversion coefficient β. The conversion coefficient denotes a value representing a ratio between the size of the input image and the size of each of the liquid crystal panels 152. The CPU 10 reads out the size of the input image and the size of the projection image from the RAM 12 to calculate the conversion coefficient β using, for example, Formula (2) below.

$$\beta = L4/L2 \quad (2)$$

The CPU 10 stores the conversion coefficient β thus calculated in the RAM 12. In the example described above, the numbers are L2=800, L4=768, and the conversion coefficient β becomes β=0.96. It should be noted that the conversion coefficient β can also be calculated with Formula (3) below using the offset value α.

$$\beta = L3/(L1-\alpha) \quad (3)$$

In the step SA27, the CPU 10 resizes the input image using the offset value α and the conversion coefficient β. Specifically, the CPU 10 converts the coordinate (x, y) of each of the pixels in the input image into the coordinate (X, Y) using Formula (4) below. It should be noted that "x" and "X" each represent a coordinate in the horizontal direction of the image, and "y" and "Y" each represent a vertical coordinate of the image.

$$\begin{pmatrix} X \\ Y \end{pmatrix} = \beta \times \begin{pmatrix} x-\alpha \\ y \end{pmatrix} \quad (4)$$

The CPU 10 writes the image data representing the resized image in the frame memory 12a.

FIG. 6 is referred to again. In the step SA3, the CPU 10 compresses the image data representing the resized image. Specifically, the CPU 10 reads out the image data from the frame memory 12a to thereby obtain the image data, and then compresses the image data so as to correspond to the frequency band of the wireless LAN. The CPU 10 compresses the image data using, for example, the JPEG (Joint Photographic Experts Group) method. The compression of the image data is performed, for example, every several frames, or every predetermined period of time. The CPU 10 stores the compressed image data in the RAM 12. In the step SA4, the CPU 10 reads out the compressed image data from the RAM 12, and then outputs the image data to the tablet terminal 3.

In the step SA5, the CPU 10 performs the image processing on the resized image. Specifically, the CPU 10 reads out the image data from the frame memory 12a, and then performs predetermined image processing (e.g., a process of superimposing an OSD (On Screen Display) image, a keystone distortion correction process, a frame rate conversion process, and an overdrive process) on the resized image. The CPU 10 writes the image data representing the resized image, on which the image processing has been performed, in the frame memory 12b. In the step SA6, the CPU 10 drives the liquid crystal panels 152 in accordance with the image data stored in the frame memory 12b. Specifically, the CPU 10 reads out the image data from the frame memory 12b, and then outputs the image data to the panel drive circuit 155.

In the step SA7, the CPU 30 of the tablet terminal 3 displays the image, which corresponds to the resized image represented by the image data obtained from the projector 1, on the touch panel 34. Specifically, the CPU 30 changes the size of the resized image represented by the image data to a size corresponding to the touch panel 34, and then displays the resized image, which has been changed in size, on the touch panel 34. Due to the process in the step SA7, the image corresponding to the projection image is displayed on the touch panel 34. In the step SA8, the CPU 30 converts the physical coordinate of the point designated by the user on the touch panel 34 into the coordinate of a point on the resized image represented by the image data. The process in the step SA8 is triggered by the fact that the touch panel 34 detects the operation by the user. The conversion between the physical coordinate on the touch panel 34 and the coordinate of the point on the resized image is performed using a predetermined formula. The CPU 30 stores the coordinate data representing the coordinate of the point on the resized image in the RAM 32. In the step SA9, the CPU 30 reads out the coordinate data from the RAM 32 and then outputs the coordinate data to the projector 1. It should be noted that the processes in the steps SA8 and SA9 are performed every time the touch panel 34 detects the operation by the user, and the plurality of coordinate data is sequentially output to the projector 1.

In the step SA10, the CPU 10 of the projector 1 performs a coordinate conversion process. The coordinate conversion process denotes a process of converting the coordinate system of the coordinate represented by the coordinate data into the coordinate system of the input image. Due to the coordinate conversion process, the CPU 10 converts the coordinate system of the coordinate of the resized image represented by the coordinate data obtained from the tablet terminal 3 into the coordinate system of the (original) input image on which the resizing process has not been yet performed. Specifically, the CPU 10 converts the coordinate (Xi, Yi) represented by the coordinate data obtained from the tablet terminal 3 into the coordinate (xi, yi) in the original input image with Formula (5) below using the offset value α and the conversion coefficient β read out from the RAM 12.

$$\begin{pmatrix} xi \\ yi \end{pmatrix} = \frac{1}{\beta} \times \begin{pmatrix} Xi \\ Yi \end{pmatrix} + \begin{pmatrix} \alpha \\ 0 \end{pmatrix} \quad (5)$$

The CPU 10 stores the converted coordinate (xi, yi) in the RAM 12. For example, in the example of the size described above, in the case in which the coordinate (Xi, Yi) represented by the coordinate data obtained from the tablet terminal 3 is (275, 480), the coordinate (xi, yi) in the original input image becomes (500, 500). In the step SA11, the CPU 10 reads out the coordinate (xi, yi) from the RAM 12 and then outputs the coordinate data representing the coordinate to the PC 2.

In the step SA12, the CPU 20 of the PC 2 draws a picture corresponding to the coordinate data obtained from the projector 1 on the input image (the primary image). Specifically, the CPU 20 interpolates the coordinates represented by the plurality of coordinate data to thereby draw the picture (hereinafter a "trajectory image") corresponding to a trajectory of the point designated by the user on the touch panel 34. The CPU 20 stores the sequence, in which the coordinates sequentially output from the projector 1 are obtained, in the RAM 12, and forms the image by connecting the plurality of coordinates to each other along the sequence while interpolating the coordinates as the trajectory image. The sequence in which the coordinates are obtained is stored in the RAM 22 together with the coordinates when the CPU 20 obtains the coordinate data from the projector 1. Then, the CPU 20 combines the trajectory image and the primary image with each other to generate the secondary image. The CPU 20 stores the image data representing the secondary image in the RAM 22. In the step SA13, the CPU 20 reads out the image data representing the secondary image from the RAM 22, and then outputs a video signal representing the image data to the projector 1.

In the steps SA14 through SA18, the CPU 10 of the projector 1 performs substantially the same processes as the processes in the steps SA2 through SA6 on the secondary image. Due to the process in the step SA18, the projection image based on the secondary image is projected on the screen SC. In the step SA19, the CPU 30 of the tablet terminal 3 displays the image, which corresponds to the resized image of the secondary image, on the touch panel 34 using substantially the same process as the process in the step SA7. Due to the processes described hereinabove, the picture corresponding to the operation on the touch panel 34 is drawn on the input image (and the projection image), and thus, it is possible to make the tablet terminal 3 function as a pointing device for operating the PC 2. Therefore, the drawing can be performed even in the place distant from the PC 2 and the projector 1 (and the screen SC), and thus, the distance limitation in performing the drawing can be suppressed. Further, the drawing can more intuitively be performed compared to the case of operating the input section 25 of the PC 2. As an application example of the projection system PS1, it is possible that a teacher makes a student operate the tablet terminal 3 in a classroom of a school to thereby perform drawing on the input image in a place distant from the PC 2.

Second Embodiment

Figure 8:
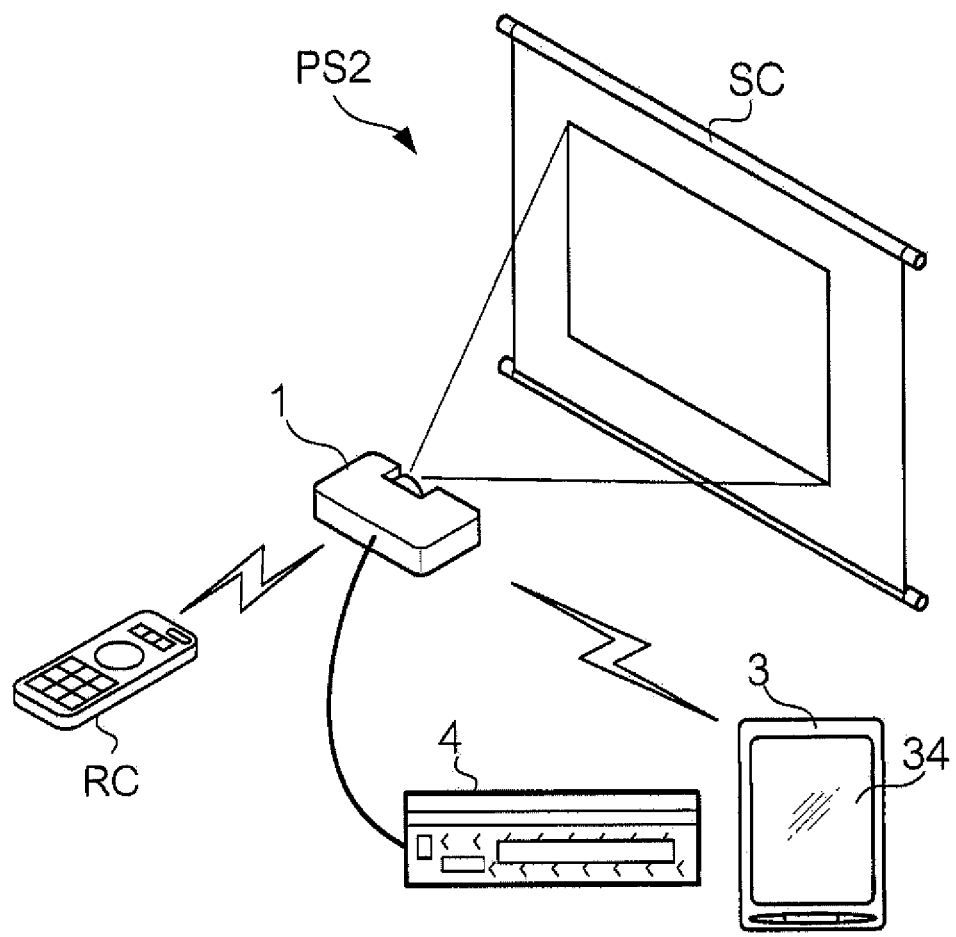
FIG. 8 is a diagram showing an overall configuration of a projection system.

FIG. 8 is a diagram showing an overall configuration of a projection system PS2 according to a second embodiment of the invention. Hereinafter, the projection system PS2 will be explained focusing on the different parts from the projection system PS1. In the projection system PS2, AV equipment such as a DVD player is used instead of the PC 2 described above. The DVD player 4 outputs the video signal to the projector 1. The DVD player 4 is connected to the HDMI terminal of the projector 1 with a cable using wired connection. In the projection system PS2, the projector 1 executes a drawing program for drawing a picture on the input image. In the case in which the projector 1 is executing the drawing program, the tablet terminal 3 functions as the pointing device for operating the projector 1. When the user operates the touch panel 34, a picture corresponding to the operation is drawn on the input image in the projector 1.

Figure 9:
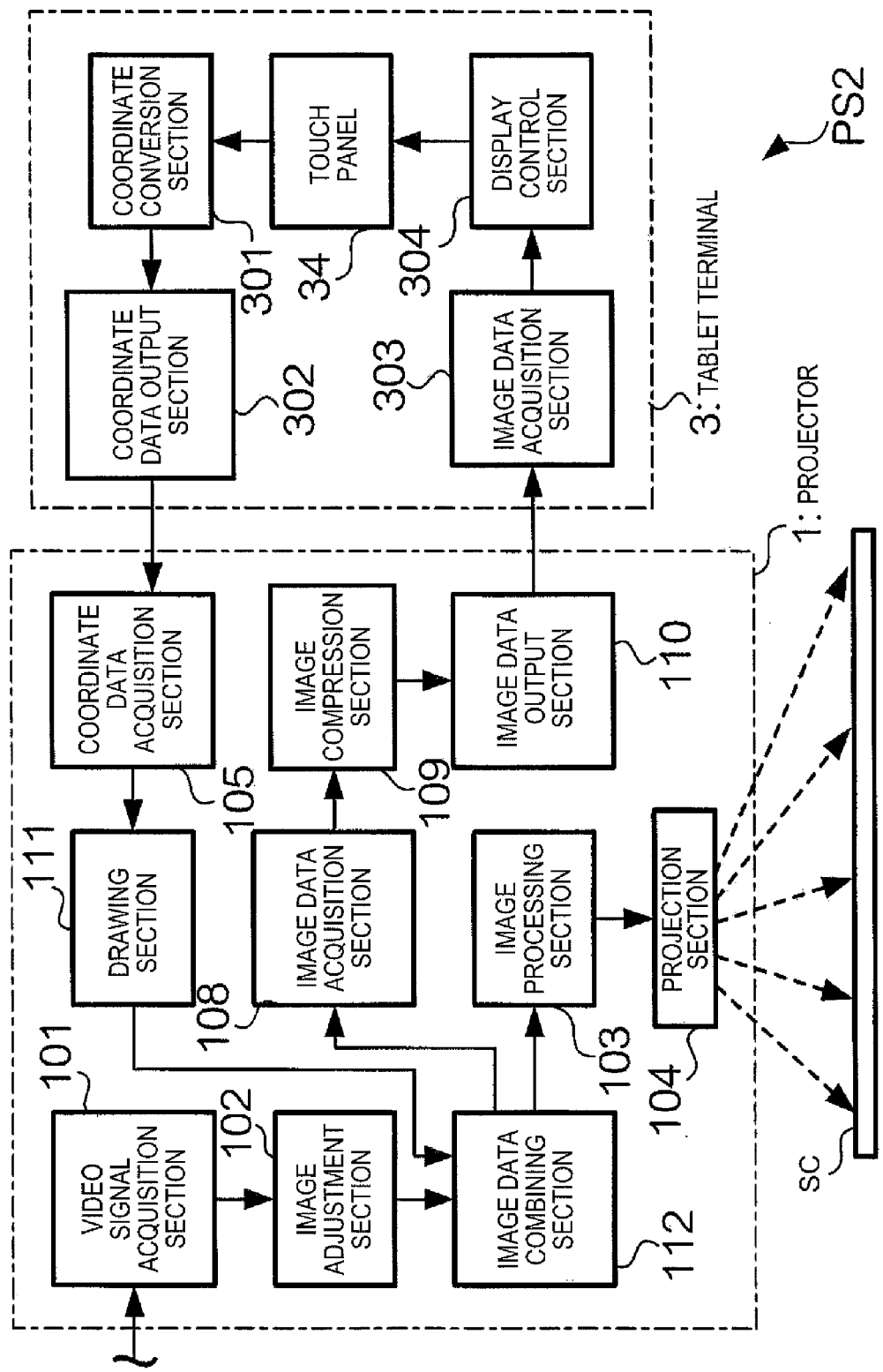
FIG. 9 is a block diagram showing a functional configuration of the projection system.

FIG. 9 is a block diagram showing a functional configuration of the projection system PS2. The projector 1 has a drawing section 111 and an image data combining section 112 instead of the coordinate conversion section 106 and the coordinate data output section 107 shown in FIG. 2. The drawing section 111 draws the picture corresponding to the coordinate data obtained by the coordinate data acquisition section 105. The image data combining section 112 combines the picture drawn by the drawing section 111 and the resized image of the primary image with each other to generate image data representing the secondary image. The image processing section 103 performs predetermined image processing on the secondary image represented by the image data generated by the image data combining section 112. The image data acquisition section 108 obtains the image data generated by the image data combining section 112. In the projector 1 according to the second embodiment, the CPU 10 executing the program is an example of the image data acquisition section 108, the image compression section 109, the drawing section 111, and the image data combining section 112.

Figure 10:
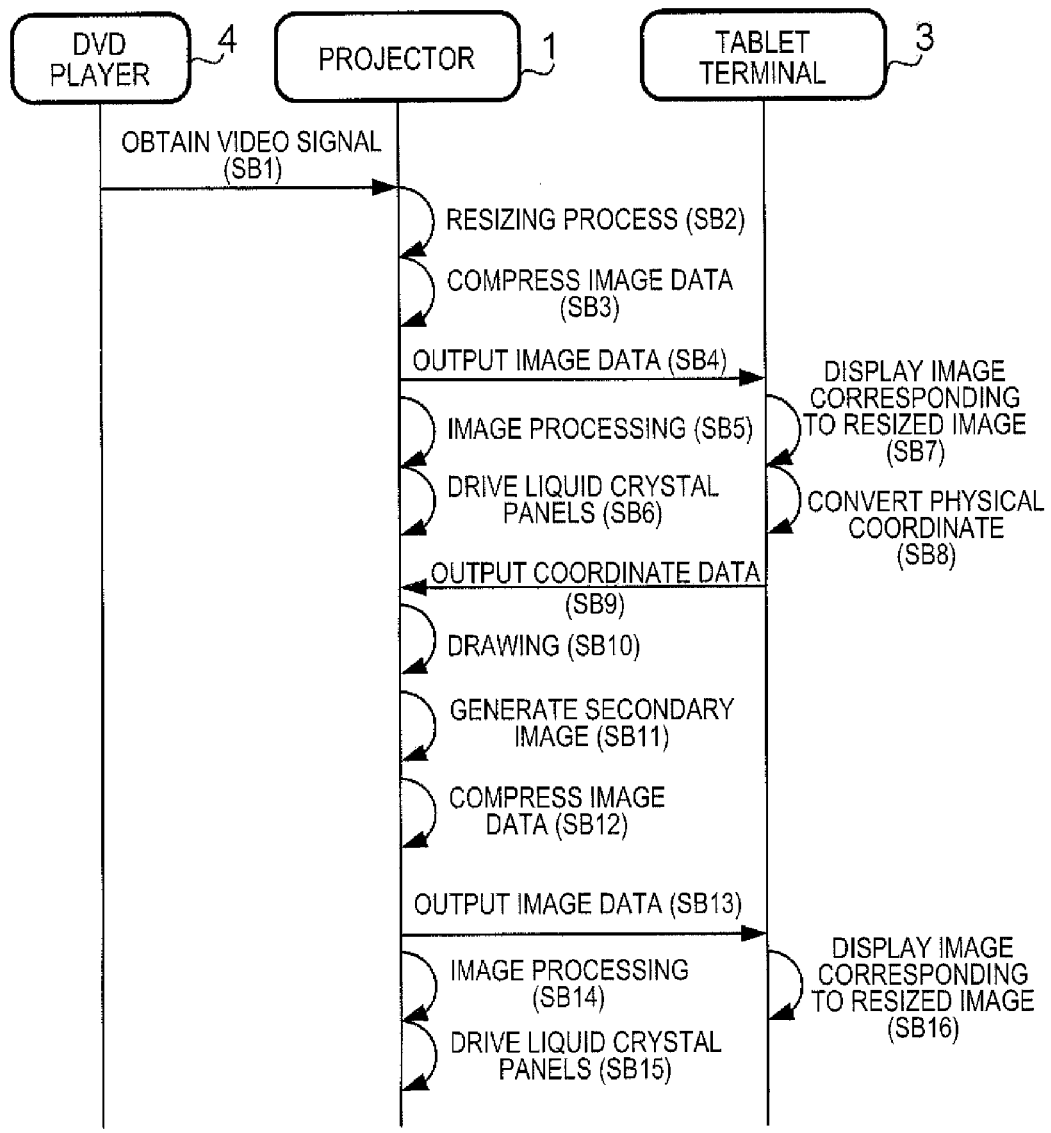
FIG. 10 is a sequence chart showing a process in the projection system.

FIG. 10 is a sequence chart showing a process executed in the projection system PS2. The following process is triggered by the fact that an instruction for making the projector 1 execute the drawing program is input to the projector 1 in a state in which the DVD player 4 is outputting the video signal (here, the video signal representing the primary image) to the projector 1. The instruction for executing the drawing program is input in response to the user operating the controller RC.

In the step SB1, the CPU 10 of the projector 1 obtains the video signal from the DVD player 4. In the steps SB2 through SB9, the CPU 10, and the CPU 30 of the tablet terminal 3 perform substantially the same processes as the processes in the steps SA2 through SA9.

In the step SB10, the CPU 10 draws the picture corresponding to the coordinate data obtained from the tablet terminal 3. Specifically, the CPU 10 interpolates the coordinates (Xi, Yi) represented by the plurality of coordinate data to thereby draw the trajectory image. The CPU 10 stores the trajectory image in the RAM 12. In the step SB11, the CPU 10 combines the trajectory image and the resized image of the primary image with each other to generate the secondary image. Specifically, the CPU 10 respectively reads out the resized image of the primary image from the frame memory 12a, and the trajectory image from the RAM 12, to combine the trajectory image on the resized image. The CPU 10 writes the image data representing the secondary image thus generated in the frame memory 12a.

In the steps SB12 through SB16, the CPU 10 and the CPU 30 perform substantially the same processes as the processes in the steps SB3 through SB7 on the secondary image. Due to the processes described hereinabove, the picture corresponding to the operation on the touch panel 34 is drawn on the input image (and the projection image), and thus, it is possible to make the tablet terminal 3 function as a pointing device for operating the projector 1. Therefore, the drawing can be performed even in the place distant from the projector 1 (and the screen SC), and thus, the distance limitation in performing the drawing can be suppressed.

Third Embodiment

Figure 11:
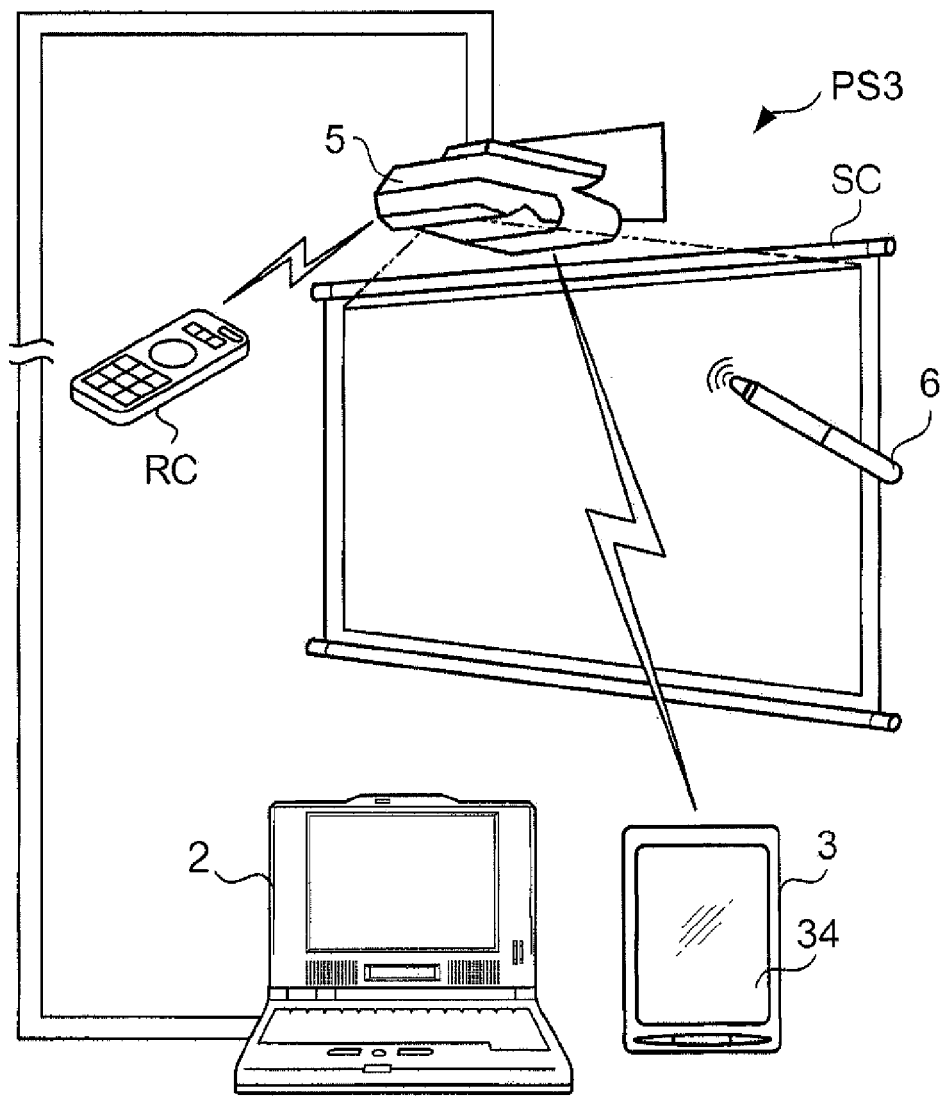
FIG. 11 is a diagram showing an overall configuration of a projection system.

FIG. 11 is a diagram showing an overall configuration of a projection system PS3 according to a third embodiment of the invention. The projection system PS3 includes a projector 5, a personal computer 2, a pointing body 6, a tablet terminal 3, a controller RC, and a screen SC. The projector 5 is a device for projecting an image (hereinafter referred to as an "input image") represented by a video signal on the screen SC. The projector 5 is a front projection short focus projector, and is disposed at a position relatively close to the screen SC. In the example shown in FIG. 11, the projector 5 is disposed above the screen SC. The personal computer (hereinafter referred to as a "PC") 2 outputs the video signal to the projector 5. The PC 2 is connected to the projector 5 with an image signal cable and a USB cable with wired connection. The PC 2 is an example of an external device to be an input source of the video signal to the projector 5. The pointing body 6 is a pen-shaped or rod-shaped operation device used as a writing material when the user electronically writes a handwritten character or image in the image (hereinafter referred to as a "projection image") projected from the projector 5. The projector 5 is provided with a function of continuously identifying the position of the pointing body 6 on the screen SC. The tablet terminal 3 is an electronic apparatus used when the user electronically writes the handwritten character or image on the input image at a position distant from the screen SC. When the user operates the touch panel 34 of the tablet terminal 3, a picture corresponding to the operation is drawn on the input image in the PC 2. The tablet terminal 3 is connected to the projector 5 via a wireless LAN compliant with, for example, Wi-Fi. The controller RC is a device for controlling the projector 5 using wireless communication such as infrared communication, a so-called remote controller. The screen SC is a plane for reflecting the projection image.

Figure 12:
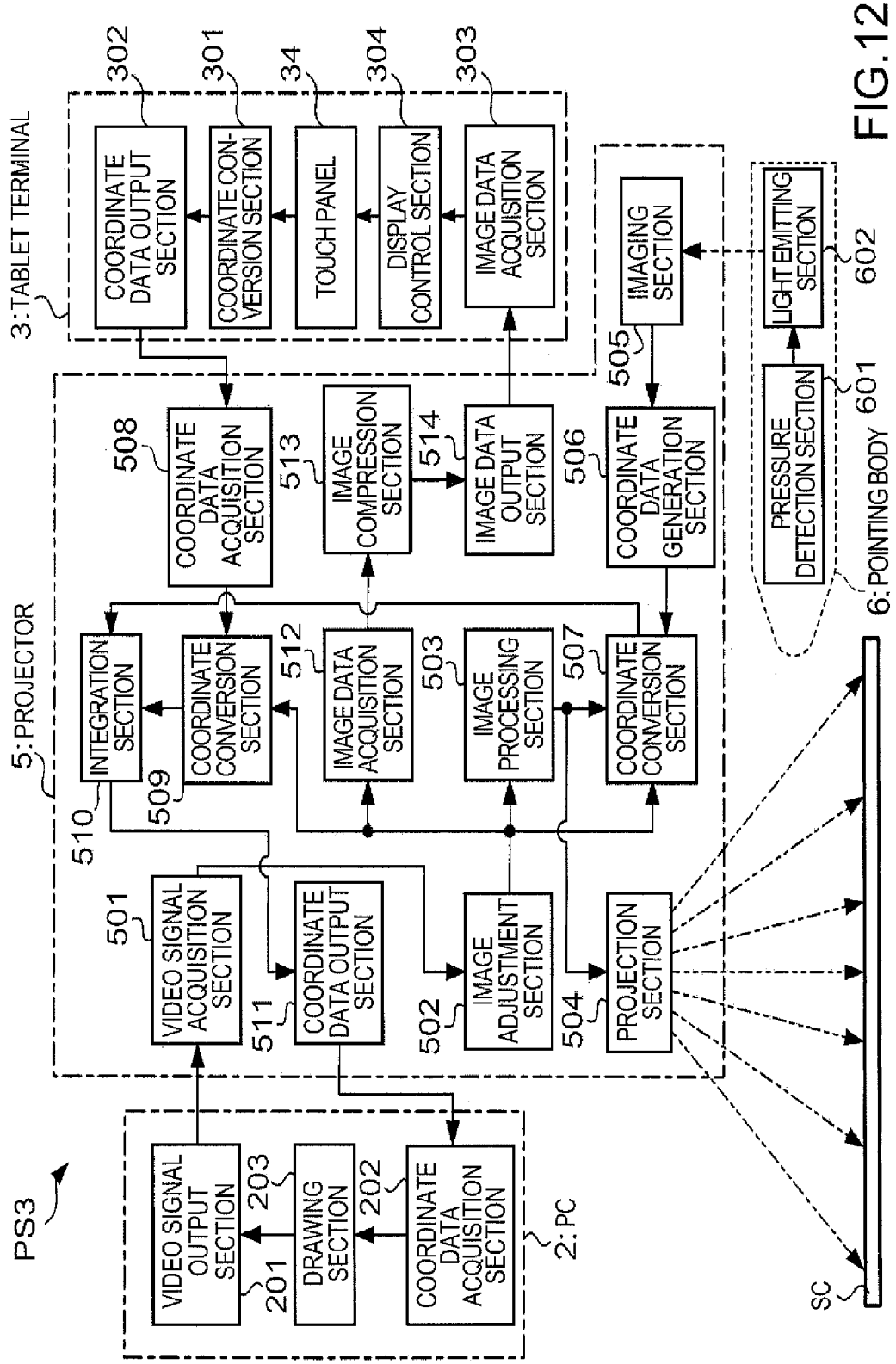
FIG. 12 is a block diagram showing a functional configuration of the projection system.

FIG. 12 is a block diagram showing a functional configuration of the projection system PS3. The pointing body 6 includes a pressure detection section 601 and a light emitting section 602. The pressure detection section 601 detects the fact that the tip of the pointing body 6 is pressed against the screen SC due to the writing action by the user. The light emitting section 602 outputs light when the pressure detection section 601 detects the fact that the tip of the pointing body 6 is pressed against the screen SC.

The projector 5 includes a video signal acquisition section 501, an image adjustment section 502, an image processing section 503, a projection section 504, an imaging section 505, a coordinate data generation section 506, a coordinate conversion section 507, a coordinate data acquisition section 508, a coordinate conversion section 509, an integration section 510, a coordinate data output section 511, an image data acquisition section 512, an image compression section 513, and an image data output section 514. The video signal acquisition section 501 obtains the video signal output from the PC 2. The image adjustment section 502 changes (resizes) the size (the resolution) of the input image to a size corresponding to the projection section 504. The image processing section 503 performs predetermined image processing on the resized input image. The image processing section 503 outputs the resized image on which the image processing has been performed to the projection section 504. The image processing section 503 is an example of an output section for outputting the video signal to the projection section 504. The projection section 504 projects the resized image, on which the image processing has been performed, on the screen SC as the projection image.

The imaging section 505 takes an image of the screen SC to generate the image data representing the light output from the projection image and the pointing body 6. The coordinate data generation section 506 (an example of a second coordinate data acquisition section) generates the coordinate data (hereinafter referred to as "pen input data") representing the coordinate of the point indicated by the user on the projection image with the pointing body 6 based on the image data generated by the imaging section 505. The pen input data is an example of second coordinate data in the invention. The coordinate conversion section 507 converts a coordinate system of the coordinate represented by the pen input data generated by the coordinate data generation section 506 into a coordinate system of the input image.

The coordinate data acquisition section 508 (an example of the first coordinate data acquisition section) obtains the coordinate data (hereinafter referred to as "touch input data"), which represents the coordinate of a point on the resized image, from the tablet terminal 3. The touch input data is an example of first coordinate data in the invention. The coordinate conversion section 509 converts a coordinate system of the coordinate represented by the touch input data obtained by the coordinate data acquisition section 508 into a coordinate system of the input image. The integration section 510 generates coordinate data (hereinafter referred to as "integrated coordinate data") obtained by integrating the pen input data generated by the coordinate data generation section 506 and the touch input data obtained by the coordinate data acquisition section 508 with each other. The "integration" denotes a process of converting the coordinates input from a plurality of pointing devices (the pointing body 6 and the tablet terminal 3 in this example) into those having a format, which can be decoded by an element (the drawing section 203 in this example) using these coordinates. In other words, in this example, the integration of the coordinate data is performed for reflecting the coordinate represented by the pen input data and the coordinate represented by the touch input data in the same coordinate data. The integrated coordinate data is an example of third coordinate data in the invention. The coordinate data output section 511 outputs the integrated coordinate data generated by the integration section 510 to the PC 2.

The image data acquisition section 512 obtains the image data representing the resized image from the image adjustment section 502. Hereinafter, for the same of convenience of explanation, the input image, in which the picture corresponding to the integrated coordinate data has not been drawn, is referred to as a "primary image," and an image obtained by drawing the picture corresponding to the integrated coordinate data on the primary image is referred to as a "secondary image." The image data obtained by the image data acquisition section 512 represents the resized image of the primary image or the secondary image. The image compression section 513 compresses the image data obtained by the image data acquisition section 512. The image data output section 514 outputs the image data compressed by the image compression section 513 to the tablet terminal 3.

The PC 2 includes a video signal output section 201, a coordinate data acquisition section 202, and a drawing section 203. The video signal output section 201 outputs the video signal to the projector 5. The coordinate data acquisition section 202 obtains the integrated coordinate data output by the projector 5. The drawing section 203 draws the picture corresponding to the integrated coordinate data obtained by the coordinate data acquisition section 202 on the primary image to thereby generate the secondary image.

The tablet terminal 3 includes a coordinate conversion section 301, a coordinate data output section 302, an image data acquisition section 303, and a display control section 304. The coordinate conversion section 301 converts the coordinate of a point pointed by the user on the touch panel 34 into the coordinate of a point on the resized image to generate the touch input data representing the coordinate. The coordinate data output section 302 outputs the touch input data generated by the coordinate conversion section 301 to the projector 5. The image data acquisition section 303 obtains the image data output by the projector 5. The display control section 304 displays the image, which corresponds to the resized image, and is represented by the image data thus obtained by the image data acquisition section 303, on the touch panel 34.

Figure 13:
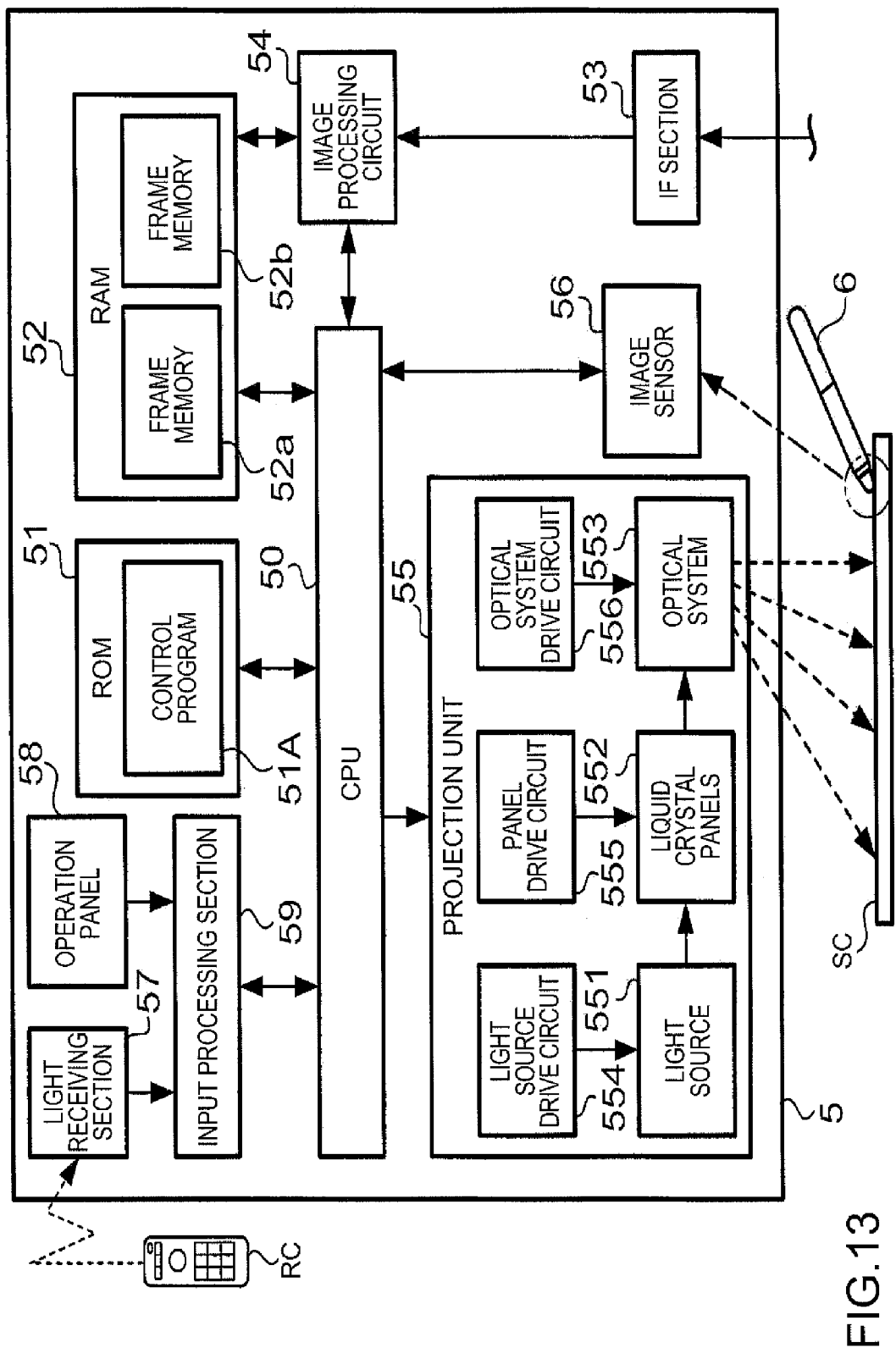
FIG. 13 is a block diagram showing a hardware configuration of a projector.

FIG. 13 is a block diagram showing a hardware configuration of the projector 5. The projector 5 includes a CPU 50, a ROM 51, a RAM 52, an interface (IF) section 53, an image processing circuit 54, a projection unit 55, image sensors 56, a light receiving section 57, an operation panel 58, and an input processing section 59. The CPU 50 is a control device which executes a control program 51A to thereby control the sections of the projector 5. The ROM 51 is a nonvolatile storage device storing a variety of programs and data. The ROM 51 stores the control program 51A to be executed by the CPU 50. The RAM 52 is a volatile storage device for storing data. The RAM 52 includes a frame memory 52a and a frame memory 52b. The frame memory 52a is an area for storing one frame of the resized image. The frame memory 52b is an area for storing one frame of the projection image.

The IF section 53 communicates with an external device such as the PC 2 and the tablet terminal 3. The IF section 53 is provided with a variety of types of terminals (e.g., a VGA terminal, an USB terminal, a wired or wireless LAN interface, an S terminal, an RCA terminal, and an HDMI terminal) for connecting to the external device. In the present embodiment, the IF section 53 communicates with the PC 2 via the VGA terminal and the USE terminal. Specifically, the IF section 53 obtains the video signal from the PC 2 via the VGA terminal, and outputs the integrated coordinate data to the PC 2 via the USB terminal. The IF section 53 extracts vertical and horizontal sync signals from the video signal obtained from the PC 2. The IF section 53 also communicates with the tablet terminal 3 via the wireless LAN interface. The image processing circuit 54 performs a resizing process and predetermined image processing on the input image. The image processing circuit 54 writes the resized image in the frame memory 52a, and writes the resized image (i.e., the projection image) after the image processing in the frame memory 52b.

The projection unit 55 includes a light source 551, liquid crystal panels 552, an optical system 553, a light source drive circuit 554, a panel drive circuit 555, and an optical system drive circuit 556. The light source 551 has a lamp such as a high-pressure mercury lamp, a halogen lamp, or a metal halide lamp, or a light emitting body such as an LED or a laser diode, and irradiates the liquid crystal panels 552 with light. The liquid crystal panels 552 are each a light modulation device for modulating the light emitted from the light source 551 in accordance with the image data. In the present example, each of the liquid crystal panels 552 has a plurality of pixels arranged in a matrix. Each of the liquid crystal panels 552 has the resolution of, for example, XGA, and has a display area composed of 1024×768 pixels. In this example, the liquid crystal panels 552 are each a transmissive liquid crystal panel, and the transmittance of each of the pixels is controlled in accordance with the image data. The projector 5 has three liquid crystal panels 552 corresponding respectively to the three primary colors of RGB. The light from the light source 551 is separated into colored lights of three colors of RGB, and the colored lights respectively enter the corresponding liquid crystal panels 552. The colored lights, which have been modulated while passing through the respective liquid crystal panels, are combined by a cross dichroic prism or the like, and the combined light is then emitted to the optical system 553. The optical system 553 includes a lens for enlarging the light modulated by the liquid crystal panels 552 into the image light and then projecting the light on the screen SC, a zoom lens for performing expansion/contraction of the image to be projected, and the focus adjustment, a zoom controlling motor for controlling a zoom level, a focus adjusting motor for performing the focus adjustment, and so on. The light source drive circuit 554 drives the light source 551 with the control by the CPU 50. The panel drive circuit 555 drives the liquid crystal panels 552 in accordance with the image data output from the CPU 50. The optical system drive circuit 556 drives the motors included in the optical system 553 with the control by the CPU 50.

The image sensors 56 are a solid-state imaging element group for taking the image of the screen SC to generate the image data. The image sensors 56 are each formed of, for example, a CMOS image sensor or a COD image sensor. The projector 5 has a plurality of image sensors 56 (the image sensor group), and these image sensors 56 take the image of the screen SC with a field angle including the largest range in which the projection unit 15 can project the projection image. The light receiving section 57 receives an infrared signal transmitted from the controller RC, decodes the infrared signal thus received, and then outputs the result to the input processing section 59. The operation panel 58 has buttons and switches for performing ON/OFF of the power and a variety of operations of the projector 5. The input processing section generates the information representing the operation content by the controller RC or the operation panel 58, and then outputs the information to the CPU 50.

In the projector 5, the CPU 50 executing the program is an example of the coordinate data generation section 506, the coordinate conversion sections 507, 509, the integration section 510, the image data acquisition section 512, and the image compression section 513. The IF section 53, which is controlled by the CPU 50 executing the program, is an example of the video signal acquisition section 501, the coordinate data acquisition section 508, the coordinate data output section 511, and the image data output section 514. The image processing circuit 54, which is controlled by the CPU 50 executing the program, is an example of the image adjustment section 502 and the image processing section 503. The projection unit 55, which is controlled by the CPU 50 executing the program, is an example of the projection section 504. The image sensors 56, which are controlled by the CPU 50 executing the program, are an example of the imaging section 505.

The hardware configuration of the PC 2 is substantially the same as shown in FIG. 4 related to the first embodiment. Therefore, the graphical description thereof will be omitted. The hardware configuration of the tablet terminal 3 is substantially the same as shown in FIG. 5 related to the first embodiment. Therefore, the graphical description thereof will be omitted.

Figure 14:
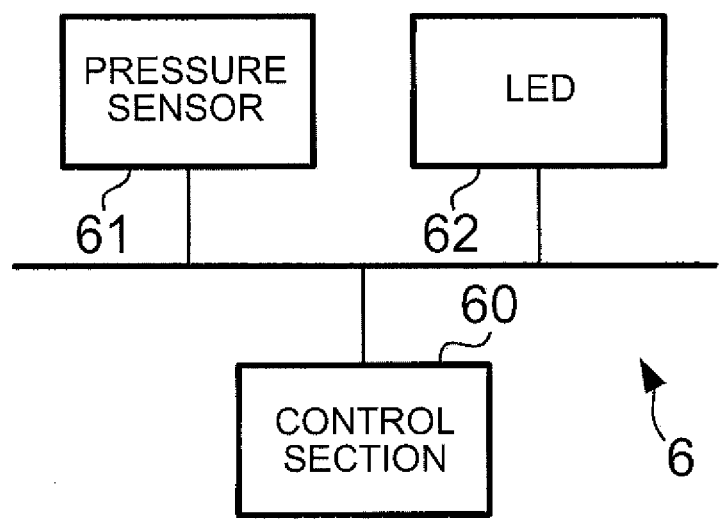
FIG. 14 is a block diagram showing a hardware configuration of an indicating body.

FIG. 14 is a block diagram showing a hardware configuration of the pointing body 6. The pointing body 6 includes a control section 60, a pressure sensor 61, and an LED 62. The control section 60 is a control device for controlling the action of each of the sections of the pointing body 6. The pressure sensor 61 is disposed at the tip of the pointing body 6, and detects the pressure to the tip of the pointing body 6. The LED 62 outputs light with a wavelength unique to the pointing body 6. In the pointing body 6, the pressure sensor 61 controlled by the control section 60 is an example of the pressure detection section 601. The LED 62 controlled by the control section 60 is an example of the light emitting section 602.

Figure 15:
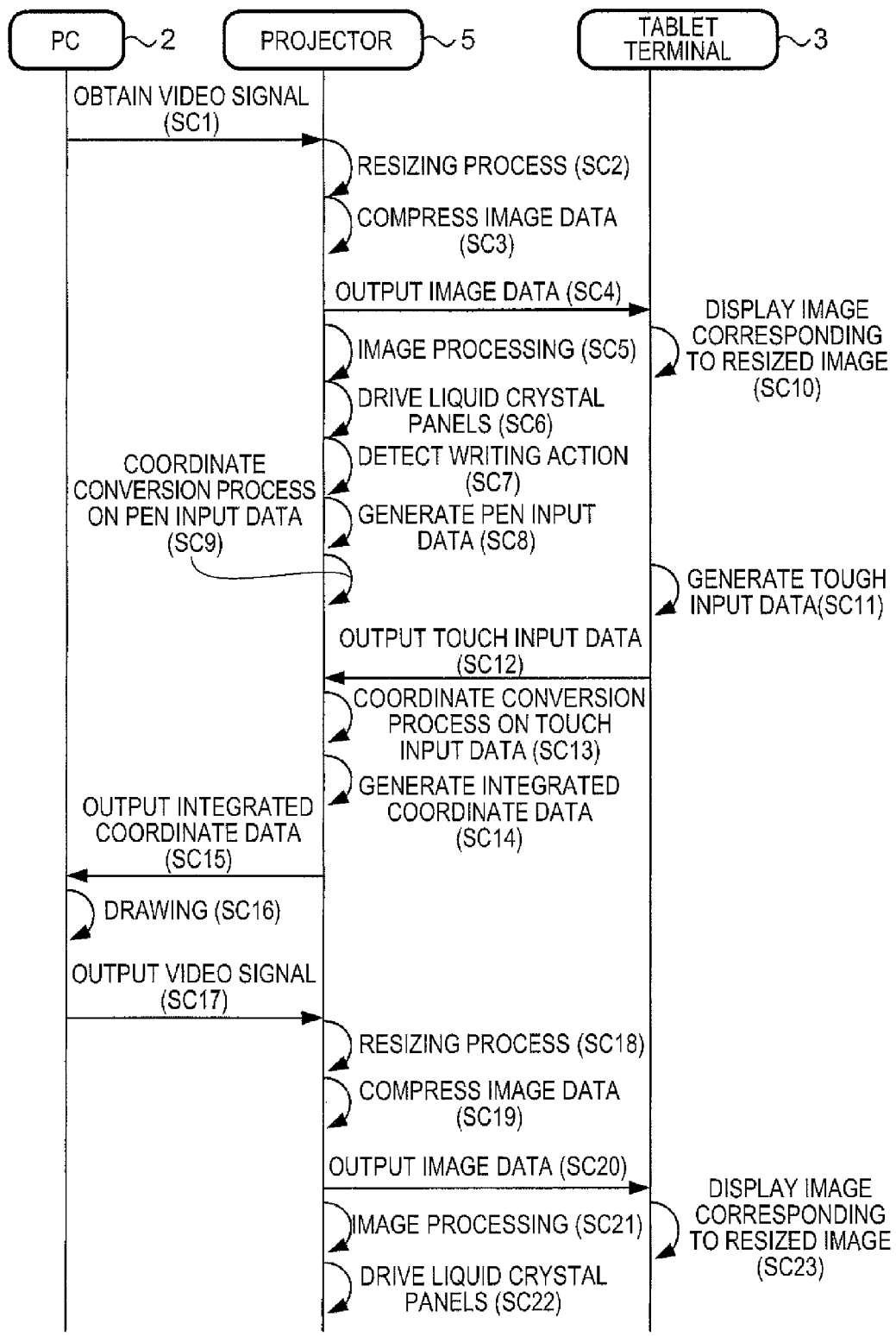
FIG. 15 is a sequence chart showing a process in the projection system.

FIG. 15 is a sequence chart showing a process executed in the projection system PS3. In this example, the PC 2 executes a drawing program for drawing a picture on the input image (here, the image displayed on the display section 24). In such a circumstance, in the case of attempting to perform drawing on the input image (and the projection image), there can be cited a method of operating the input section 25 (e.g., the mouse) of the PC 2, and a method of performing a writing action using the pointing body 6. However, in the method of operating the input section 25 of the PC 2, since the projector 5 and the PC 2 are connected to each other with the wired connection, there arises a distance limitation in performing the drawing in a place distant from the projector 5. Further, in the method of performing the writing action using the pointing body 6, since it is necessary to have direct contact with the projection image projected on the screen SC, it is unachievable to perform the drawing in a place distant from the screen SC. The projection system PS3 makes the tablet terminal 3 function as a pointing device for operating the PC 2 to thereby suppress the distance limitation in performing the drawing. The process shown in FIG. 15 is triggered by, for example, the fact that the PC 2 outputs the video signal (here, the video signal representing the primary image) to the projector 5. It should be noted that the case in which the writing action using the pointing body 6 and the operation of the tablet terminal 3 are both performed by the respective users different from each other will hereinafter be explained as an example.

In the step SC1, the CPU 50 of the projector 5 obtains the video signal from the PC 2. In the step SC2, the CPU 50 performs the resizing process on the input image. The resizing process is substantially the same as the resizing process explained with reference to FIG. 7 related to the first embodiment. Due to the resizing process, the offset value α and the conversion coefficient β are calculated. Due to the resizing process, the CPU 50 changes the size of the input image to a size corresponding to the liquid crystal panels 552.

In the step SC3, the CPU 50 compresses the image data representing the resized image. Specifically, the CPU 50 reads out the image data from the frame memory 52a to thereby obtain the image data, and then compresses the image data so as to correspond to the frequency band of the wireless LAN. The CPU 50 compresses the image data using, for example, the JPEG method. The compression of the image data is performed, for example, every several frames, or every predetermined period of time. The CPU 50 stores the compressed image data in the RAM 52. In the step SC4, the CPU 50 reads out the compressed image data from the RAM 52 and then outputs the image data to the tablet terminal 3.

In the step SC5, the CPU 50 performs the image processing on the resized image. Specifically, the CPU 50 reads out the image data from the frame memory 52a, and then performs predetermined image processing (e.g., a process of superimposing an OSD image, a keystone distortion correction process, a frame rate conversion process, and an overdrive process) on the resized image. The CPU 50 writes the image data representing the resized image (the projection image), on which the image processing has been performed, in the frame memory 52b. In the step SC6, the CPU 50 drives the liquid crystal panels 552 in accordance with the image data stored in the frame memory 52b. Specifically, the CPU 50 reads out the image data from the frame memory 52b, and then outputs the image data to the panel drive circuit 555.

In the step SC7, the CPU 50 detects that the writing action using the pointing body 6 has been performed on the projection image projected on the screen SC. Specifically, the CPU 50 controls the image sensors 56 to perform imaging at predetermined time intervals (e.g., every 0.1 second). The CPU 50 analyzes the image data representing the image thus taken, and then detects the light output from the pointing body 6 to thereby detect the writing action. In the step SC8, the CPU 50 generates the pen input data. Specifically, the CPU 50 calculates the coordinate of the point pointed by the pointing body 6 on the projection image based on the position of the light in the image thus taken. The CPU 50 stores the pen input data thus generated in the RAM 52. The process in the step SC8 is performed every time the writing action is detected, and a plurality of pen input data is generated sequentially.

In the step SC9, the CPU 50 performs the coordinate conversion process on the pen input data. The coordinate conversion process denotes a process of converting the coordinate system of the coordinate represented by the coordinate data into the coordinate system of the input image. Here, the CPU 50 converts the coordinate system of the coordinate of the projection image represented by the pen input data into the coordinate system of the (original) input image on which the resizing process has not yet been performed. The specific process is as follows. Firstly, the CPU 50 converts the coordinate on the projection image represented by the pen input data into the coordinate on the resized image. The conversion between the coordinate on the projection image and the coordinate on the resized image is performed using a formula determined in accordance with the content of the image processing performed in the step SC5. For example, in the case in which the keystone distortion correction process is performed on the resized image in the step SC5, the CPU 50 performs a process of performing the reverse conversion of the keystone distortion correction process to thereby convert the coordinate on the projection image into the coordinate on the resized image. Then, the CPU 50 converts the coordinate on the resized image, on which the conversion has been performed, into the coordinate in the original input image. The conversion between the coordinate ($X_i$, $X_i$) on the resized image and the coordinate ($x_i$, $y_i$) on the original input image is performed with Formula (5) described with respect to the first embodiment using the offset value α and the conversion coefficient β stored in the RAM 52 due to the resizing process.

The CPU 50 stores the converted coordinate ($x_i$, $y_i$) in the RAM 52.

In the step SC10, the CPU 30 of the tablet terminal 3 displays the image, which corresponds to the resized image represented by the image data obtained from the projector 5, on the touch panel 34. Specifically, the CPU 30 changes the size of the resized image represented by the image data to a size corresponding to the touch panel 34, and then displays the resized image, which has been changed in size, on the touch panel 34. Due to the processing in the step SC10, the image corresponding to the projection image is displayed on the touch panel 34. In the step SC11, the CPU 30 generates the touch input data. Specifically, the CPU 30 converts the physical coordinate of the point pointed by the user on the touch panel into the coordinate of a point on the resized image represented by the image data. The process in the step SC11 is triggered by the fact that the touch panel 34 detects the operation by the user. The conversion between the physical coordinate on the touch panel 34 and the coordinate of the point on the resized image is performed using a predetermined formula. The CPU 30 stores the touch input data thus generated in the RAM 32. In the step SC12, the CPU 30 reads out the touch input data from the RAM 32 and then outputs the touch input data to the projector 5. It should be noted that the processes in the steps SC11 and SC12 are performed every time the touch panel 34 detects the operation by the user, and the plurality of touch input data is sequentially output to the projector 5.

In the step SC13, the CPU 50 of the projector 5 performs the coordinate conversion process on the touch input data obtained from the tablet terminal 3. Here, the CPU 50 converts the coordinate system of the coordinate of the resized image represented by the touch input data into the coordinate system of the original input image. Specifically, the CPU 50 converts the coordinate (Xi, Yi) on the resized image represented by the touch input data into the coordinate (xi, yi) in the original input image using Formula (5) described with respect to the first embodiment. For example, in the example of the size described above, in the case in which the coordinate (Xi, Yi) represented by the touch input data is (275, 480), the coordinate (xi, yi) in the original input image becomes (500, 500). The CPU 50 stores the converted coordinate (xi, yi) in the RAM 52. It should be noted that the coordinate (xi, yi) (hereinafter referred to as a "pen input coordinate") obtained by the coordinate conversion process (the step SC9) on the pen input data, and the coordinate (xi, yi) (hereinafter referred to as a "touch input coordinate") obtained by the coordinate conversion process (the step SC13) on the touch input data are stored in the RAM 52 in a state of being distinguished from each other using respective identifiers different from each other. In other words, the pen input coordinate based on the pen input data and the touch input coordinate based on the touch input data are distinguished from each other using the respective identifiers different from each other.

In the step SC14, the CPU 50 integrates the pen input data and the touch input data with each other to generate the integrated coordinate data. The integration of the pen input data and the touch input data is performed in response to, for example, selection of either one of the pen input coordinate and the touch input coordinate. The CPU 50 selects the coordinate obtained by either one of the series of writing actions using the pointing body 6 and the series of operations of the touch panel 34, which starts earlier. Here, the series of writing actions using the pointing body 6 denotes the action of the user from pressing the tip of the pointing body 6 against the screen SC to releasing the tip, or a cluster of a plurality of such actions in which the user separates the tip of the pointing body 6 from the screen SC for a time shorter than a predetermined time. The series of operations of the touch panel 34 denotes the action of the user from touching the touch panel 34 to separating therefrom, or a cluster of a plurality of such actions in which the user does not touch the touch panel 34 for a time shorter than a predetermined time. When either one of the series of writing actions using the pointing body 6 or the series of operations of the touch panel 34 is started in the state in which neither the input from the pointing body 6 nor the input from the touch panel 34 exists, the coordinate obtained by the one of the series of the writing actions and the series of operations is selected until the one of the series of the writing actions and the series of operations is terminated. The state in which no input from the pointing body 6 exists denotes the state in which the user separates the tip of the pointing body 6 for a time equal to or longer than the predetermined time. The state in which no input from the touch panel 34 exists denotes the state in which the user does not touch the touch panel 34 for a time equal to or longer than the predetermined time. In the example shown in FIG. 15, the series of writing actions using the pointing body 6 is started prior to the series of operations of the touch panel 34, and therefore, the CPU 50 selects the pen input coordinate. The CPU 50 stores the integrated coordinate data thus generated in the RAM 52. In the step SC15, the CPU 50 reads out the integrated coordinate data from the RAM 52 and then outputs the integrated coordinate data to the PC 2.

In the step SC16, the CPU 20 of the PC 2 draws a picture corresponding to the integrated coordinate data obtained from the projector 5 on the primary image. Specifically, the CPU 20 interpolates the plurality of coordinates (xi, yi) (hereinafter referred to as "integrated coordinates") represented by the integrated coordinate data to thereby draw the picture (hereinafter referred to as a "trajectory image") corresponding to the trajectory of the point, which the user has pointed with the pointing body 6 on the screen SC (on the projection surface), or the point, which the user has pointed on the touch panel 34. The CPU 20 stores the sequence, in which the integrated coordinates sequentially output from the projector 5 are obtained, in the RAM 22, and forms the image by connecting the plurality of integrated coordinates to each other along the sequence while interpolating the coordinates as the trajectory image. The sequence in which the integrated coordinates are obtained is stored in the RAM 22 together with the integrated coordinates when the CPU 20 obtains the integrated coordinate data from the projector 5. Then, the CPU 20 combines the trajectory image and the primary image with each other to generate the secondary image. The CPU 20 stores the image data representing the secondary image into the RAM 22. In the step SC17, the CPU 20 reads out the image data representing the secondary image from the RAM 22, and then outputs a video signal representing the image data to the projector 5.

In the steps SC18 through SC22, the CPU 50 of the projector 5 performs substantially the same processes as the processes in the steps SC2 through SC6 on the secondary image. Due to the process in the step SC22, the projection image based on the secondary image is projected on the screen SC. In the step SC23, the CPU 30 of the tablet terminal 3 displays the image, which corresponds to the resized image of the secondary image, on the touch panel 34 using substantially the same process as the process in the step SC10. Due to the processes described hereinabove, the tablet terminal 3 can be made to function as a pointing device for operating the PC 2. Thus, the picture corresponding the writing action using the pointing body 6 or the operation of the touch panel 34 is drawn on the input image (and the projection image). Therefore, in the case of tempting to perform the drawing on the input image, it becomes possible for the user to arbitrarily select the method of performing the writing action using the pointing body 6 and the method of operating the touch panel 34. According to the method of operating the touch panel 34, since the drawing can be performed even in the place distant from the screen SC, the distance limitation in performing the drawing can be suppressed. As an application example of the projection system PS3, it is possible that a teacher performs drawing on the input image by performing the writing action on the screen SC, and a student operates the tablet terminal 3 to thereby perform drawing on the input image in a place distant from the screen SC in a classroom of a school.

Fourth Embodiment

Figure 16:
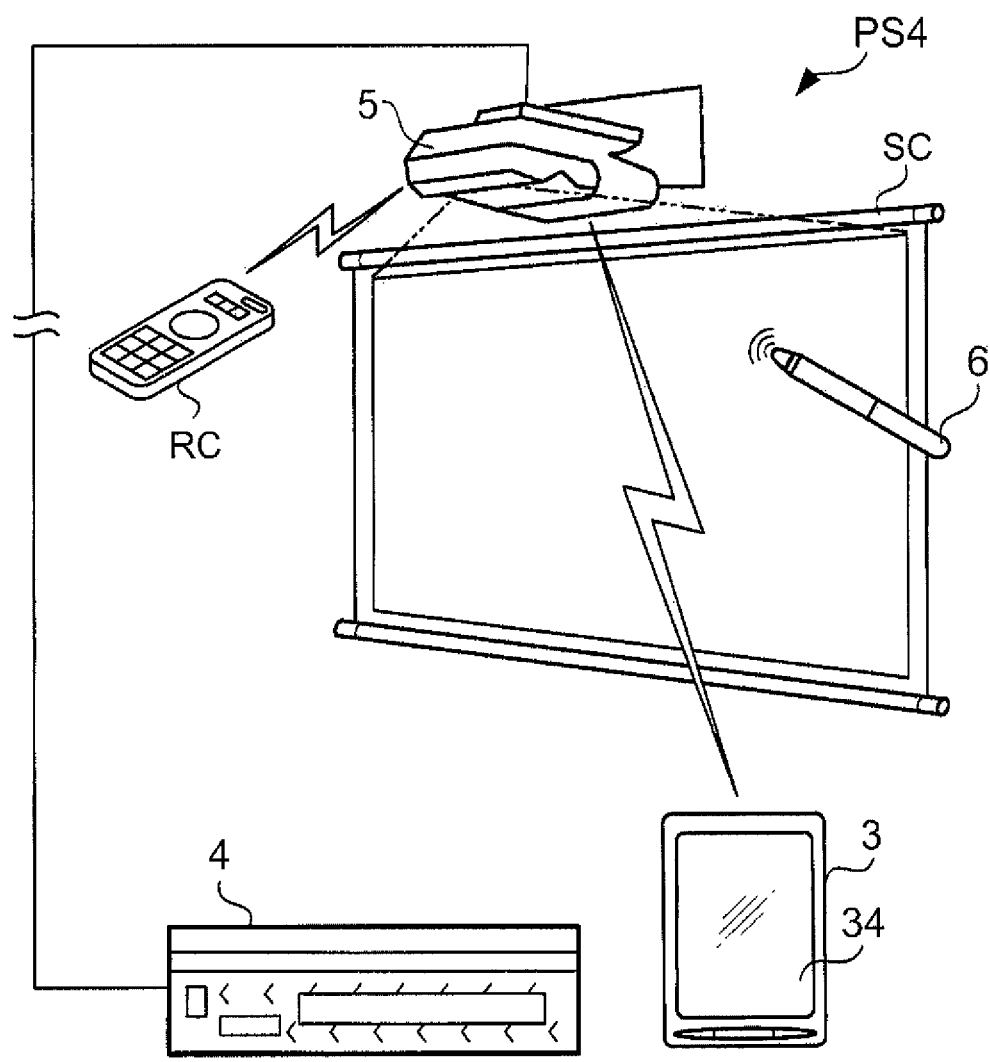
FIG. 16 is a diagram showing an overall configuration of a projection system.

FIG. 16 is a diagram showing an overall configuration of a projection system PS4 according to a fourth embodiment of the invention. Hereinafter, the projection system PS4 will be explained focusing on the different parts from the projection system PS3. In the projection system PS4, AV equipment such as a DVD player 4 is used as the video signal source instead of the PC 2 described above. The DVD player 4 outputs the video signal to the projector 5. The DVD player 4 is connected to the HDMI terminal of the projector 5 with a cable using wired connection. In the projection system PS4, the projector 5 executes a drawing program for drawing a picture on the input image. In the case in which the projector 5 is executing the drawing program, the tablet terminal 3 functions as the pointing device for operating the projector 5. When the user operates the touch panel 34, a picture corresponding to the operation is drawn on the input image in the projector 5.

Figure 17:
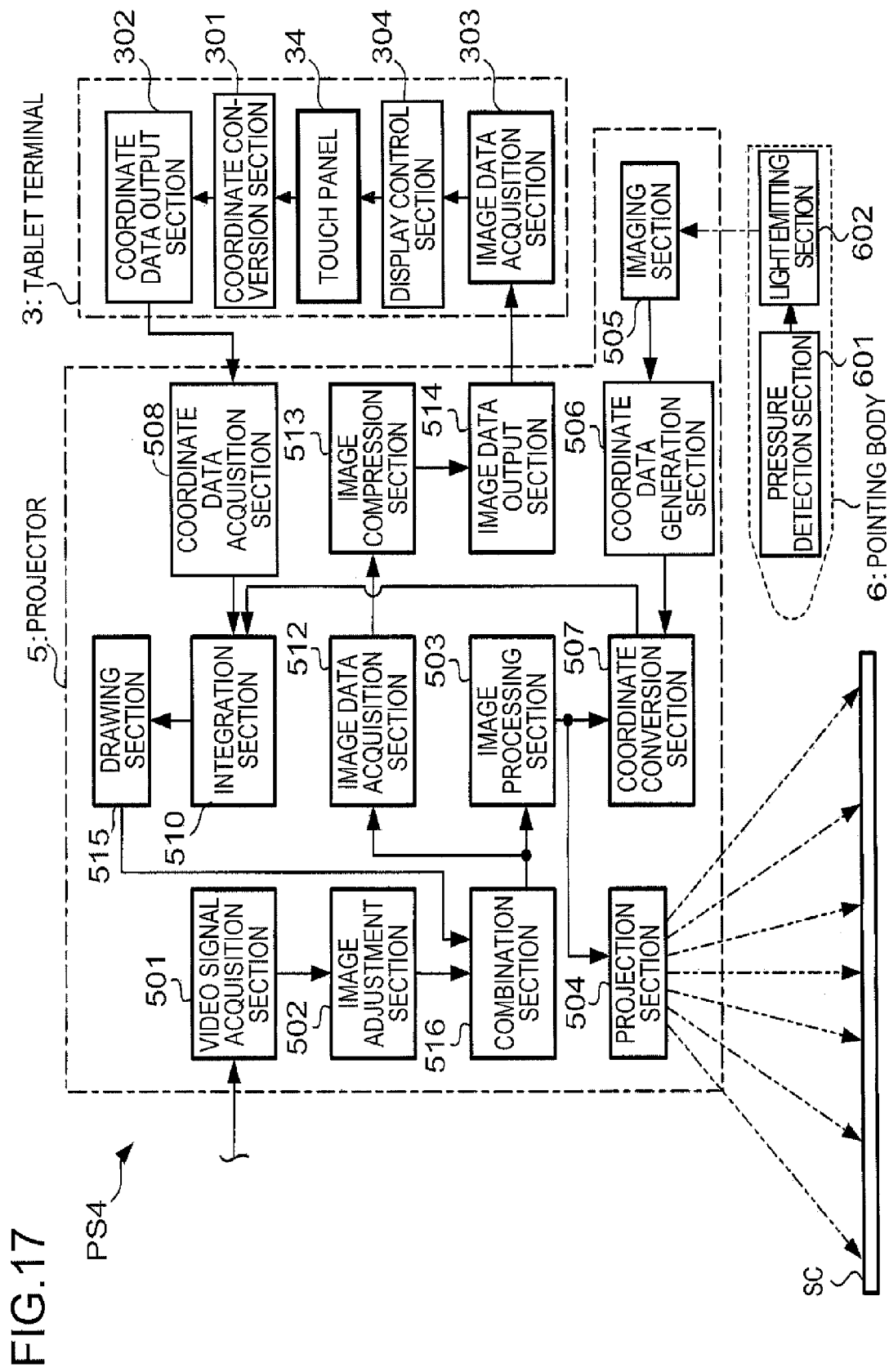
FIG. 17 is a block diagram showing a functional configuration of the projection system.

FIG. 17 is a block diagram showing a functional configuration of the projection system PS4. The projector 5 has a drawing section 515 and a combination section 516 instead of the coordinate conversion section 509 and the coordinate data output section 511 shown in FIG. 12. The drawing section 515 draws the picture corresponding to the integrated coordinate data generated by the integration section 510. The combination section 516 combines the picture drawn by the drawing section 515 and the resized image of the primary image with each other to generate image data representing the secondary image. The image processing section 503 performs predetermined image processing on the secondary image represented by the image data generated by the combination section 516. The image processing section 503 outputs the secondary image, on which the image processing has been performed, to the projection section 504. The image data acquisition section 512 obtains the image data generated by the combination section 516. It should be noted that in the projection system PS4, the coordinate conversion section 507 converts a coordinate system of the coordinate represented by the pen input data generated by the coordinate data generation section 506 into a coordinate system of the resized image. In the projector 5 according to the fourth embodiment, the CPU 50 executing the program is an example of the coordinate data generation section 506, the coordinate conversion section 507, the integration section 510, the image data acquisition section 512, the image compression section 513, the drawing section 515, and the combination section 516.

Figure 18:
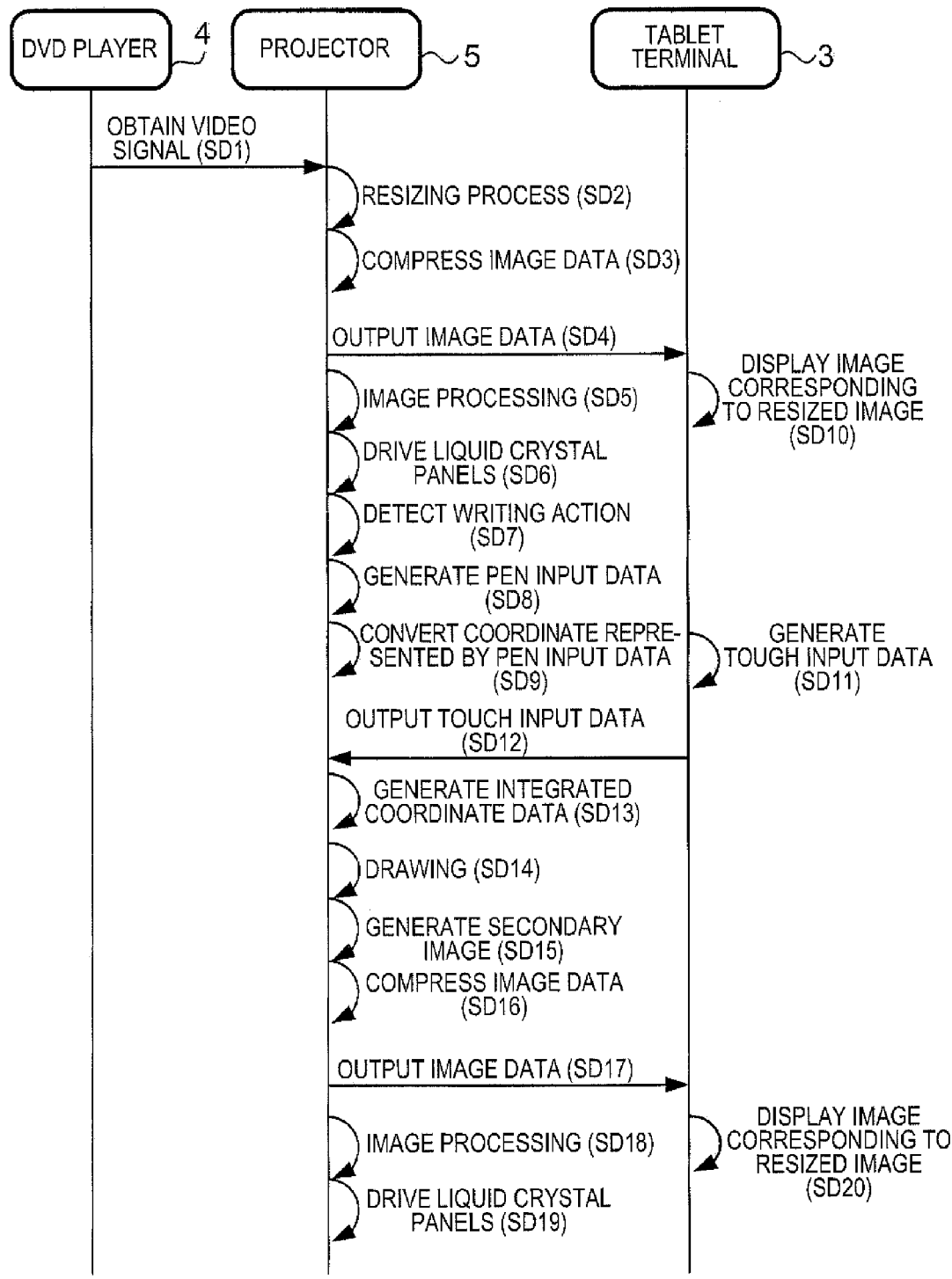
FIG. 18 is a sequence chart showing a process in the projection system.

FIG. 18 is a sequence chart showing a process executed in the projection system PS4. The following process is triggered by the fact that an instruction for making the projector 5 execute the drawing program is input to the projector 5 in a state in which the DVD player 4 is outputting the video signal (here, the video signal representing the primary image) to the projector 5. The instruction for executing the drawing program is input in response to the user operating the controller RC.

In the step SD1, the CPU 50 of the projector 5 obtains the video signal from the DVD player 4. In the steps SD2 through SD8, the CPU 50 performs substantially the same processes as in the steps SC2 through SC8.

In the step SD9, the CPU 50 converts the coordinate on the projection image represented by the pen input data into the coordinate on the resized image. The conversion between the coordinate on the projection image and the coordinate on the resized image is performed using a formula determined in accordance with the content of the image processing performed in the step SD5. The CPU 50 stores the coordinate (Xi, Yi) on the resized image, on which the conversion has been performed, in the RAM 52.

In the steps SD10 through SD12, the CPU 30 of the tablet terminal 3 performs substantially the same processes as in the steps SC10 through SC12. In the step SD13, the CPU 50 of the projector 5 integrates the pen input data and the touch input data with each other to generate the integrated coordinate data. It should be noted that the pen input data and the touch input data integrated with each other in the step SD13 each represent the coordinate (Xi, Yi) on the resized image, and the integrated coordinate represented by the integrated coordinate data also represents the coordinate (Xi, Yi) on the resized image. In the step SD14, the CPU 50 draws the picture corresponding to the integrated coordinate data. Specifically, the CPU 50 interpolates a plurality of integrated coordinates (Xi, Yi) to thereby draw the trajectory image. The CPU 50 stores the trajectory image into the RAM 52. In the step SD15, the CPU 50 combines the trajectory image and the resized image of the primary image with each other to generate the secondary image. Specifically, the CPU 50 respectively reads out the resized image of the primary image from the frame memory 52a, and the trajectory image from the RAM 52, to combine (overlay) the trajectory image on the resized image. The CPU 50 writes the image data representing the secondary image thus generated in the frame memory 52a.

In the steps SD16 through SD19, the CPU 50 performs substantially the same process as in the steps SD3 through SD6. Due to the processes described hereinabove, the tablet terminal 3 can be made to function as a pointing device for operating the projector 5. Thus, the picture corresponding to the writing action using the pointing body 6 or the operation of the touch panel 34 is drawn on the input image (and the projection image). According to the method of operating the touch panel 34, since the drawing can be performed even in the place distant from the screen SC, the distance limitation in performing the drawing can be suppressed.

MODIFIED EXAMPLES

The invention is not limited to the embodiments described above, but can be put into practice with a variety of modifications. Hereinafter, some modified examples will be explained. It is also possible to use two or more of the modified examples explained hereinafter in combination.

1. Modified Example 1

The processes performed in the projection system are not limited to the processes explained in the description of the embodiments. For example, the compression of the image data can also be performed every frame.

Further, in the above description of the embodiments, there is explained the example in which the image data on which the image processing has not been performed is read out from the frame memory, and the image data thus read out is output to the tablet terminal 3. In this respect, it is also possible that the image data on which the image processing has already been performed is readout from the frame memory, and the image data, which is obtained by performing the predetermined process on the image data thus read out, is output to the tablet terminal 3. For example, in the case of performing the keystone distortion correction process on the resized image, it is also possible for the CPU 10 and the CPU 50 to perform a process of performing the reverse conversion of the keystone distortion correction process on the image data on which the keystone distortion correction process has been performed, and then output the image data, on which the reverse conversion has been performed, to the tablet terminal 3. It should be noted that in this case, each of the RAM 12, 52 of the projectors 1, 5 is not necessarily required to have two frame memories.

Further, although in the above description of the embodiments, there is explained the example in which the picture corresponding to the coordinate data is drawn on the primary image, it is also possible to further draw the picture corresponding to the coordinate data on the secondary image.

2. Modified Example 2

In the above description of the embodiments, there is explained the example of calculating the offset value $\alpha$ and the conversion coefficient $\beta$ every frame in the resizing process. In this respect, during a period in which the video signal is continuously input to the projectors 1, 5, it is also possible to resize the input image using the same values as the offset value $\alpha$ and the conversion coefficient $\beta$ once calculated. On this occasion, the CPU 10 and the CPU 50 store the offset value $\alpha$ and the conversion coefficient $\beta$ once calculated in the RAM 12, 52 during the period in which the video signal is continuously input, and resize the plurality of input images using these values.

3. Modified Example 3

Formulas 1 through 5 described above shown with respect to the resizing process and the coordinate conversion process are illustrative only, and it is also possible to perform the resizing process or the coordinate conversion process using formulas different from these formulas. For example, although in the above description of the embodiments, there is explained the case in which the offset value is the value representing the horizontal number of the pixels uniformly removed from the input image, the offset value can also be a value representing the vertical number of the pixels uniformly removed from the input image. On this occasion, the offset value is calculated using a formula different from Formula (1). Further, although in the above description of the embodiments, there is explained the example of contracting the input image in the resizing process, the input image can also be expanded in the resizing process.

4. Modified Example 4

Although in the above description of the third and fourth embodiments, there is explained the example in which the integrated coordinate data represents either one of the pen input coordinate (or the coordinate represented by the pen input data; the same applies hereinafter) and the touch input coordinate (or the coordinate represented by the touch input data; the same applies hereinafter). In this respect, it is also possible for the integrated coordinate data to represent both of the pen input coordinate and the touch input coordinate. In this case, the pen input coordinate and the touch input coordinate are stored in the RAM 52 while being distinguished from each other using the respective identifiers different from each other. Further, on this occasion, the identifier for identifying the pen input coordinate and the identifier for identifying the touch input coordinate thus distinguished from each other can also correspond to other input devices of the external device (or the projector 5). For example, it is also possible that the PC 2 further includes a touch panel as an input device in addition to the hardware configuration described above, and the identifier for identifying the pen input coordinate corresponds to the mouse of the PC 2, and the identifier for identifying the touch input coordinate corresponds to the touch panel, respectively. According to this example, when the user performs the writing action using the pointing body 6, the drawing corresponding to the operation of the mouse of the PC 2 is performed, and when the user operates the touch panel 34, the drawing corresponding to the operation of the touch panel of the PC 2 is performed.

Further, although in the above description of the third and fourth embodiments, there is described the processing example of the case in which the writing action using the pointing body 6 is performed prior to the operation of the touch panel 34, it is obviously possible that the operation of the touch panel 34 is performed prior to the writing action using the pointing body 6. In this case, the processes described in the steps SC7 through SC9 (the steps SD7 through SD9) are performed after the processes described in the steps SC11 through SC13 (the steps SD11 and SD12).

Further, although in the above description of the embodiments, there is explained the example in which the picture corresponding to the integrated coordinate data is drawn on the primary image, it is also possible to further draw the picture corresponding to the integrated coordinate data on the secondary image.

5. Modified Example 5

The configuration of the projection system is not limited to the configurations described in the description of the embodiments. For example, although in the description of the first embodiment, there is explained the example in which the IF section 13 of the projector 1 outputs the coordinate data to the PC 2 via the USE terminal, it is also possible for the IF section 13 to output the coordinate data via the wireless LAN interface. In another example, it is also possible to use a plurality of tablet terminals 3 or a plurality of pointing bodies 6 in the projection system. In this case, the touch input coordinates obtained from the plurality of tablet terminals 3, or the pen input coordinates obtained from the plurality of pointing bodies 6 can also be distinguished using respective identifiers different from each other. According to this example, there is performed the drawing corresponding to the different input device of the external device (or the projector 1 or 5) between the case in which the user operates a certain touch panel 34, and the case in which the user operates another touch panel 34. In still another example, a video player can also be used instead of the DVD player 4.

6. Modified Example 6

The functional configuration of the projector 1 is not limited to the case of using either one of the configurations respectively shown in FIGS. 2 and 9. It is also possible for the projector 1 to include both of the functional configurations shown in FIGS. 2 and 9. In this case, the projector 1 performs the process shown in FIG. 6 in the case in which the input source of the video signal is the PC 2, or performs the process shown in FIG. 10 in the case in which the input source of the video signal is the DVD player 4.

7. Modified Example 7

The functional configuration of the projector 5 is not limited to the case of using either one of the configurations respectively shown in FIGS. 12 and 17. It is also possible for the projector 5 to include both of the functional configurations shown in FIGS. 12 and 17. In this case, the projector 5 performs the process shown in FIG. 15 in the case in which the input source of the video signal is the PC 2 (i.e., the external device for executing the drawing program), or performs the process shown in FIG. 18 in the case in which the input source of the video signal is the DVD player (i.e., the external device not performing the drawing program). In another example, the imaging section 505 and the coordinate data generation section 506 can also be external constituents of the projector 5. In this case, the projector 5 has a coordinate data acquisition section for obtaining the pen input data generated by the coordinate data generation section 506.

8. Modified Example 8

The hardware configurations of the projector 1, the PC 2, and the tablet terminal 3 are not limited to the configurations shown in FIGS. 3 through 5. The projector 1, the PC 2, and the tablet terminal 3 can have any hardware configurations providing the processes of the respective steps shown in FIGS. 6, 7, and 10 can be executed. For example, although in the above description of the embodiments, there is explained the example in which the projector 1 has the three liquid crystal panels 152, the projector 1 can also be configured using a system obtained by combining the single liquid crystal panel 152 and a color wheel with each other, a system using three digital mirror devices (DMD™), a system obtained by combining a single DMD™ and the color wheel with each other, and so on.

9. Modified Example 9

The hardware configurations of the projector 5 and the pointing body 6 are not limited to the configurations shown in FIGS. 13 and 14. The projector 5, the PC 2, the tablet terminal 3, and the pointing body 6 can have any hardware configurations providing the processes of the respective steps shown in FIGS. 15 and 18 can be executed. For example, although in the above description of the embodiments, there is explained the example in which the projector 5 has the three liquid crystal panels 552, the projector 5 can also be configured using a system obtained by combining the single liquid crystal panel 552 and a color wheel with each other, a system using three digital mirror devices (DMD™), a system obtained by combining a single DMD™ and the color wheel with each other, and so on.

10. Modified Example 10

Although in the embodiments described above, the explanation is presented citing the projectors 1, 5 as examples of the image display device, the image display device is not limited to the projectors. It is also possible to apply the invention to, for example, a rear projector integrally provided with a transmissive screen, and a flat panel display (FPD) such as a liquid crystal display, a plasma display, or an organic EL display.

11. Modified Example 11

Although in the above description of the third and fourth embodiments, it is assumed that the pointing body 6 emits the light with a unique wavelength, the invention is not limited to this configuration. For example, it is also possible to arrange to use a radio wave for wireless communication. Further, the pointing body 6 can also be a finger of the user.

What is claimed is:

1. An image display device comprising:
an interface configured to obtain a video signal representing an input image;
a processor configured to resize the input image to generate a first image; and
a projector configured to project the first image, wherein the interface is further configured to:
obtain touch panel data representing a coordinate of a point on the first image from an electronic apparatus having a touch panel, and
obtain pointing body data representing a coordinate of a point pointed by a user with a pointing body on a projection surface projected on by the projector,
the processor is further configured to:
generate first coordinate data by converting the touch panel data into a coordinate system of the input image,
generate second coordinate data by converting the pointing body data into the coordinate system of the input image,
generate third coordinate data obtained by converting the first coordinate data and second coordinate data into a single format, and
obtain image data representing a third image, which is obtained by drawing a picture corresponding to the third coordinate data on the first input image,
the interface is further configured to output the image data obtained by the processor to the electronic apparatus, and
the projector is further configured to project the third image.

2. The image display device according to claim 1, wherein the third coordinate data represents selected one of a coordinate represented by the first coordinate data and a coordinate represented by the second coordinate data.

3. The image display device according to claim 1, wherein the third coordinate data includes both of a coordinate represented by the first coordinate data and a coordinate represented by the second coordinate data distinguished with identifiers different from each other.

4. The image display device according to claim 3, wherein the identifier of the coordinate represented by the first coordinate data and the identifier of the coordinate represented by the second coordinate data correspond to respective input devices different from each other.

5. The image display device according to claim 1, wherein:
the interface is further configured to output the third coordinate data generated by the processor to an external device, which is an input source of the video signal, and
the processor is further configured to obtain the image data from the external device.

6. The image display device according to claim 1, wherein the processor is further configured to:
draw the picture corresponding to the third coordinate data; and
combine the input image and the picture with each other to generate the image data.

7. An image display system comprising:
an image display device; and
an electronic apparatus,
wherein the image display device includes:
an interface configured to obtain a video signal representing an input image,
a processor configured to resize the input image to generate a first image, and a projector configured to project the first image,
the interface is further configured to obtain touch panel data representing a coordinate of a point on the first image from the electronic apparatus,
the processor is further configured to:
  generate first coordinate data by converting the touch panel data into a coordinate system of the input image, and
  obtain image data representing a second image obtained by drawing a picture, which corresponds to the first coordinate data, on the first image,
the interface is further configured to:
  output the image data representing the second image, which is obtained by the processor, to the electronic apparatus, and
  obtain pointing body data representing a coordinate of a point pointed by the user with a pointing body on a projection surface on which the first image is projected by the projector, and
the processor is further configured to:
  generate second coordinate data by converting the pointing body data into the coordinate system of the input image,
  generate a third coordinate data obtained by converting the first coordinate data and second coordinate data into a single format, and
  obtain image data representing a third image obtained by drawing the picture, which corresponds to the third coordinate data, on the input image, and
the projector is further configured to project the third image,
the electronic apparatus includes:
  a touch panel,
  a display, and
  an apparatus processor configured to:
    convert a coordinate of a point designated by a user on the touch panel into a coordinate of a point on the first image to generate the touch panel data,
  an apparatus interface configured to:
    output the touch panel data generated by the apparatus processor to the image display device,
  the apparatus processor is further configured to:
    make the display the second image represented by the image data output by the image display device.

8. The image display system according to claim 7, wherein
the interface of the image display device is further configured to output the image data representing the third image to the electronic apparatus, and
the apparatus processor is further configured to make the display the third image represented by the image data output by the interface of the image display device.

9. A method of controlling an image display device, comprising:
obtaining a video signal representing an input image;
resizing the input image to generate a first image;
obtaining touch panel data representing a coordinate of a point on the first image from an electronic apparatus having a touch panel;
projecting, by a projector, the first image;
obtaining pointing body data representing a coordinate of a point pointed by a user with a pointing body on a projection surface projected on by the projector;
generating first coordinate data by converting the touch panel data into a coordinate system of the input image;
generating second coordinate data by converting the pointing body data into the coordinate system of the input image,
generating third coordinate data obtained by converting the first coordinate data and second coordinate data into a single format; and
obtaining image data representing a third image obtained by drawing a picture corresponding to the third coordinate data on the input image;
projecting, by the projector, the third image; and
outputting the image data to the electronic apparatus.

* * * * *